US008650505B2

(12) United States Patent
Anttila et al.

(10) Patent No.: US 8,650,505 B2
(45) Date of Patent: Feb. 11, 2014

(54) MULTI-STATE UNIFIED PIE USER INTERFACE

(75) Inventors: Akseli Anttila, Helsiniki (FI); Petri Piippo, Lempaala (FI); Timo-Pekka Viljamaa, Helsinki (FI); Rob Harr-Van-Der, Helsinki (FI); Tuomas Vaittinen, Helsinki (FI)

(73) Assignee: RPX Corporation, San Francisco, CA (US)

( * ) Notice: Subject to any disclaimer, the term of this patent is extended or adjusted under 35 U.S.C. 154(b) by 275 days.

(21) Appl. No.: 11/680,258

(22) Filed: Feb. 28, 2007

(65) Prior Publication Data

US 2009/0083665 A1    Mar. 26, 2009

(51) Int. Cl.
*G06F 3/048* (2013.01)

(52) U.S. Cl.
USPC .......................................... 715/834; 715/818

(58) Field of Classification Search
USPC .................................. 715/818, 834
See application file for complete search history.

(56) References Cited

U.S. PATENT DOCUMENTS

| | | | | |
|---|---|---|---|---|
| 6,710,771 | B1 * | 3/2004 | Yamaguchi et al. | 345/184 |
| 2002/0018080 | A1 * | 2/2002 | Ageta et al. | 345/810 |
| 2003/0122882 | A1 | 7/2003 | Kho | |
| 2004/0070629 | A1 | 4/2004 | Seifert | |
| 2004/0135824 | A1 * | 7/2004 | Fitzmaurice | 345/856 |
| 2004/0221243 | A1 | 11/2004 | Twerdahl et al. | |
| 2004/0250217 | A1 * | 12/2004 | Tojo et al. | 715/810 |
| 2005/0275637 | A1 * | 12/2005 | Hinckley et al. | 345/173 |
| 2006/0059437 | A1 * | 3/2006 | Conklin, III | 715/800 |
| 2007/0008300 | A1 * | 1/2007 | Yang et al. | 345/173 |
| 2008/0066101 | A1 * | 3/2008 | Song | 725/37 |
| 2008/0222569 | A1 * | 9/2008 | Champion et al. | 715/834 |

FOREIGN PATENT DOCUMENTS

| | | |
|---|---|---|
| EP | 1585320 | 10/2005 |
| GB | 2366171 | 2/2002 |
| JP | 2004-112392 A | 4/2004 |
| KR | 10-2007-006477 A | 1/2004 |
| KR | 10-0627840 | 9/2006 |
| WO | 03036455 | 5/2003 |
| WO | 2005036875 | 4/2005 |

OTHER PUBLICATIONS

International Search Report dated Sep. 29, 2008.
Written Opinion dated Sep. 29, 2008.
Canadian Office Action dated Feb. 1, 2011.
Chinese Office Action dated Oct. 12, 2010.
Russian Office Action dated Nov. 11, 2010.
Chinese Office Action dated Jul. 20, 2011.
Korean Office Action dated Mar. 21, 2011.
Russian Office Action dated May 21, 2011.
Chinese Office Action dated Oct. 26, 2011.

(Continued)

*Primary Examiner* — Andrea Leggett
(74) *Attorney, Agent, or Firm* — Howison & Arnott, L.L.P.

(57) ABSTRACT

A state menu selection system that provides a function control set relating to an active application, maps at least one function from the function control set to at least one input device, and activates a function from the control set upon activation of the corresponding input device.

4 Claims, 25 Drawing Sheets

(56) References Cited

OTHER PUBLICATIONS

Second Korean Non-Final Rejection dated Nov. 30, 2011 in application No. KR10-2009-7020128 and English translation thereof.
JP Office Action dated Dec. 19, 2011, corresponding JP Application No. 2009-551279.
CN Office Action dated Jan. 31, 2012, corresponding CN Application No. 2008800065051.
AU Office Action dated Feb. 3, 2012, corresponding AU Application No. 2008220514.
Chinese Office Action dated Apr. 6, 2012, corresponding CN Application No. 2008800065051.

* cited by examiner

MULTI-STATE UNIFIED PIE USER INTERFACE

BACKGROUND

1. Field

The disclosed embodiments generally relate to content handling and control in a device and in particular to a multi-state control system.

2. Brief Description of Related Developments

Communication devices, such as for example, mobile communication devices and mobile phones, are commonly used to listen to and view different types of media files and content. Very commonly however, the user interface for one media player will be different from the media player for another device. This generally results in a different set of controls and different methods for controlling applications in one or more devices. For example, media playback control methods tend to vary from device to device and application to application. Some devices may incorporate hard "media" keys to control media playback. (See e.g. Nokia N91™) Devices that include joystick style navigation controls may map the various functions to the joystick controls. (See e.g. Nokia N70™) Other devices may provide playback control by moving the focus with the joystick and then selecting the desired playback function. (See e.g. Nokia N80™) Other devices may present their own particular user interface for media control and playback.

Some devices or applications can include an "Options" menu, from which various functions and controls can be selected. Generally, the Options menu includes a long list of available functions and controls, and does not differentiate or highlight the more important controls or the most used selections. The process to select an item from the Options menu can involve a number of highlighting and selection steps. Also, when the Options menu is selected or opened, the menu, together with any submenus, will obscure a good portion of the screen area of the device display. The Options menu is typically presented as a "list" of menu selection items, and a user has to scroll up/down, or left/right to visualize all of the available selection and control options. The media or content that is the focus of the application is at least partially obscured while the Options menu is active. It would be advantageous to be able to minimize the use of screen area with menu options, particularly with respect to smaller size devices that have limited user interface and screen areas.

For example, accessing the zoom navigation controls on device generally require the selection of a desired zoom control, such as "Zoom In" or "Zoom Out", from an Options menu of the device, or in some cases pressing "Select" to generate a context sensitive menu from where to select a Zoom In or Zoom Out function. The user needs to select the Options menu and then select the desired navigation function. While in a Zoom mode, a joystick or other such cursor control can be used to move left, right, up or down, in order to navigate the image. However, in order to further zoom in or zoom out, the user generally has to access the Options menu or press Select to see the context sensitive menu to select the desired function. It would be advantageous to be able to access navigation functions without the need to navigate through different menus and submenu in order to select the desired controls.

Also, in some cases, when a user wishes to switch between applications on a device, or navigate to another program, it is necessary to either close or minimize the current application, and then open the other application. This can also involve activating the Menu item selection to see the application grid, and then selecting the new application. It would be advantageous to be able to navigate from one application or function, including other programs that may or may not be open at the time, directly into another application, function or program without the need to close one, and open the other.

It would be advantageous to provide a quick and easy way for a user to access the various functions related to an application without the need to scroll long lists of menu selections or focus between different icons on the display. It would also be advantageous to be able to make use of a common interface that promotes the more commonly used controls related to an application or type of media content, and provides the same or similar functionality for different media types.

SUMMARY

In one aspect, the disclosed embodiments are directed to a state menu selection system. In one embodiment, the system, when activated provides a function control set relating to an active application, maps at least one function from the function control set to at least one input device, and activates a function from the control set upon activation of the corresponding input device.

In another aspect, the disclosed embodiments are directed to an apparatus. In one embodiment, the apparatus includes a content handling device, a user interface coupled to the content handling device, and a processor in the content handling device configured to activate a state menu selection system, provide a function control set relating to an active application on the device, map at least one function from the function control set to at least one input device of the content handling device, and activate one of the at least one functions mapped to the at least one input device from the function control set upon activation of the at least one input device.

In yet another aspect, the disclosed embodiments are directed to a computer program product. In one embodiment, the computer program product comprises a computer useable medium having computer readable code means embodied therein for causing a computer to execute a set of instructions in a device to activate a state menu selection system, the computer readable code means in the computer program product comprising computer readable program code means for causing a computer to provide a function control set relating to an active application after activating a state menu selection system on the device, computer readable program code means for causing a computer to map at least one function from the function control set to at least one input device, and computer readable program code means for causing a computer to activate the at least one function mapped to the at least one input device from the function control set upon activation of the at least one input device.

In a further aspect, the disclosed embodiments are directed to a user interface. In one embodiment, the user interface includes a first input actuator to activate a state menu application; a set of control functions arranged in a menu upon activation of the state menu application, the menu comprising arranged regions, wherein one region includes a single selection region and another region includes at least one other selection region, an active application that appears underneath the set of control functions, and at least one second input actuator, the set of control functions being mapped to corresponding ones of the at least one second input actuator.

BRIEF DESCRIPTION OF THE DRAWINGS

The foregoing aspects and other features of the embodiments are explained in the following description, taken in connection with the accompanying drawings, wherein:

FIGS. 2H-2N illustrate screen shots of exemplary applications of the control functions associated with the state control menu of FIG. 2G.

DETAILED DESCRIPTION OF THE EMBODIMENT(S)

Figure 1:
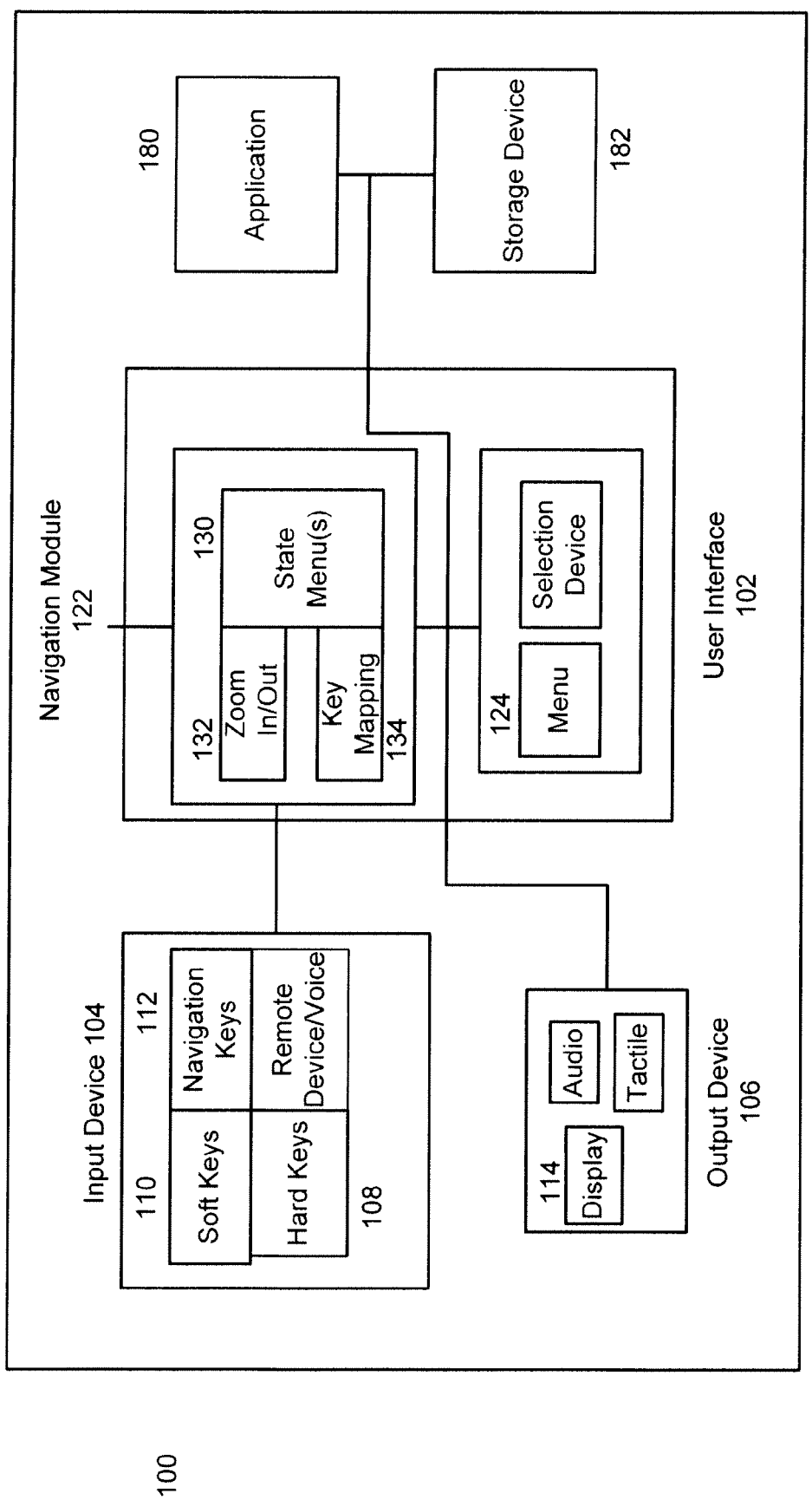
FIG. 1 shows a block diagram of a device in which aspects of the embodiments may be applied.

Referring to FIG. 1, one embodiment of a system 100 is illustrated that can be used to practice aspects of the claimed invention. Although aspects of the claimed invention will be described with reference to the embodiments shown in the drawings and described below, it should be understood that these aspects could be embodied in many alternate forms of embodiments. In addition, any suitable size, shape or type of elements or materials could be used.

The disclosed embodiments generally provide a common, graphical user interface component, also referred to herein as a state control menu, which promotes the functions associated with an application, or other applications and/or functions, in a quick and readily accessible manner. The state control menu can present different functions related to an application, in different contexts. The functions can be selected or activated by using for example, actuators or keys of the respective device, to which the various functions have been mapped. The state control menu can work similarly for different applications and in particular, media application types.

The state control menu described herein will generally be referred to and illustrated as a "pie" style menu. Generally, a pie menu is a two-dimensional form that has menu items or function selection areas positioned around a center area. In one embodiment, set of control functions can be arranged in a radial menu that has concentrically arranged regions. The use of a radial style menu structure can ease the compatibility of the menu with a multifunction navigational control, such as a 4-way or 5-way multi-positional control device. In alternate embodiments, the regions can be arranged in any desired or suitable form. Although the embodiments described herein will generally be with respect to a pie or radial style menu, in alternate embodiments, the state control menu can be configured in any suitable structure, other than including a pie or radial structure. For example, in one embodiment a menu can be aligned to one or more side regions of the display of the device, where hard and soft keys are correspondingly aligned to allow control of the side menus. In one embodiment, a state control menu might include an inner region and at least one outer region. The inner region can include a single selection region and the outer regions can include other selection regions. The menu item target regions, or selection areas, can take any desired form or suitable shape. In alternate embodiments, the state control menu can take any suitable or desired form shape, other than including a pie style menu. For example, a graphical icon that is divided into selection areas can be used. Alternatively, any geometric shape that includes different menu selection areas for different control functions can be used. For each application, various state control menus can be available.

Figure 2A:
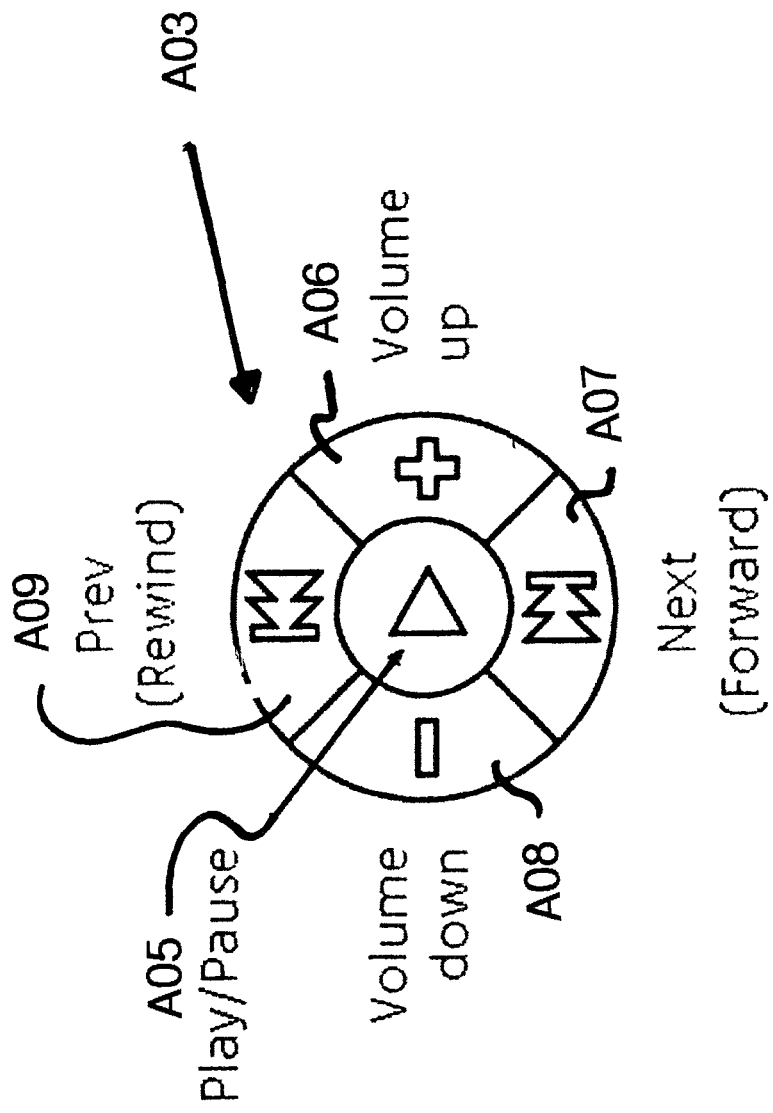
FIG. 2A is an example of one embodiment of a state control menu.

One example of state menu control is illustrated in FIG. 2A. The menu A03 includes a center region A05, and four surrounding regions A06-A09. While this control A03 illustrates a control that maps to a 5-way position actuator, the control A03 can map to a 4-way position actuator and not include a center region, for example. Each sector or region of the menu A03 has or corresponds to a different function associated with the underlying application. In alternate embodiments, the menu control A03 can include any suitable number of sectors or regions. Although in this example, the functions of the menu control A03 map to functions of the underlying application, in alternate embodiments, the functions of the menu control A03 can map to an application other than including the underlying or active application. For example, the functions could map to an application not yet active, but becomes active, is downloaded or opens when the control is activated. The application can be stored on the device or on a separate storage facility.

In this particular example of FIG. 2A, the underlying application is a media or media playback application, and the control menu A03 is a media playback control state menu. Although the disclosed embodiments will generally be described herein with respect to media playback applications, the disclosed embodiments can be implemented in any suitable application where access to and control of functions of the application is desirable. Examples of applications can include, but are not limited to, messaging applications, web browsers and search applications and data processing applications.

In FIG. 2A, each sector or region A05-A09 corresponds to one of the functions associated with the media playback application, such as for example, "play" A05 and "volume down" A08. It should be noted that the particular location of each of the functions or controls illustrated in FIG. 2A is merely exemplary, and in alternate embodiments, the controls can be located in any suitable or desired position on the menu A03. For example, the volume controls could be in an "up" "down" or top and bottom orientation, while the fast-forward and rewind could be in the "left" and "right" positions of the menu A03.

As described herein the state control menu is generally configured to overlie an active application that is being displayed on the display of the corresponding device, without obscuring the display of the active or underlying application. In alternate embodiments, the state control menu does not need to overlie another application or display, or the active application. In one embodiment, the state control menu A03 is configured to have an opaque or semi-transparent look or appearance so that the screen or user interface of the underlying application is only partly obscured by the state control menu A03. As shown for example in FIG. 2B, the state control menu B122 can be configured to allow the user to "see through" the menu to the screen or display of an active application or function of the device. The outline of the control appear as darker or distinguishable lines, as do the graphics of the icons therein. However, the underlying image is still relatively viewable. This can allow greater utilization of the real estate of the display area by being able to view the active application, such as a media playback, while at the same time being able to view, at least partially, the state control menu.

In one embodiment, the functions or controls displayed in the state control menu, such as menu A03 of FIG. 2A can be mapped to actuators or keys of the corresponding device, such as the input device 104 of device 100 illustrated in FIG. 1. The device 100 of FIG. 1 generally includes a user interface 102, input device 104, output device 106, application area 180 and storage device 182. The components described herein are merely exemplary and are not intended to encompass all components that can be included in a system 100. While the user interface 102, input device 104 and output device 106 are shown as separate devices, in one embodiment, the input device 104 and output device 106 can be part of, and form, the user interface 102.

The input device 104 receives inputs and commands from a user and passes the inputs to the navigation module 122 for processing. The output device 106 can receive data from the user interface 102, application 180 and storage device 182 for output to the user. While a display 114 is shown as part of the output device 106, in other embodiments, the output device 106 could also include other components and device that transmit information to a user, including for example audio devices and tactile devices.

The input device 104 enables a user to provide instructions and commands to the device 100. As shown in FIG. 1, the input device 104 of the device 100 can include, for example, one or more hard (individual) keys 108, soft keys 110 and multi-function/scroll key(s) or actuators 112. In alternate embodiments, the input device 104 can include any suitable style of input mechanism, such as for example, remote control input receiving devices or voice activation/recognition commands. In one embodiment, the multi-function/scroll actuator 112 can comprise a navigation style input device or a joystick style input control device, for example. This can include for example a four- or five-way key which can be used for cursor movement, scrolling and selecting (five-way key) and can generally be placed centrally on the front surface of the device 100. This allows direct mapping of the functions of the menu to the keys or input of the device.

The user interface 102 can also include a menu system 120 and navigation module 122. The menu system 120 can provide for the selection of different tools and application options related to the applications running on the device 100. The navigation module 122 provides for the control of certain processes of the device 100. In the embodiments disclosed herein, the navigation module 122 receives certain transmissions or commands related to the state menu system and other functions of the device 100. For example, with respect to the state menu system, depending on the input or command, the navigation module interprets the commands and directs the state menu control 130, the key mapping 134 or zoom in/out control 132 accordingly. In alternate embodiments, the navigation module 122 can include any desired or suitable process controls related to the system 100.

Referring to the menu A03 shown in FIG. 2A, each of the functions A05-A09 can be mapped to a corresponding one of the actuators, keys or key sets 108, 110, 112 of the input device 104. The term "key" will generally be used herein to describe the actuator device 108-112, for descriptive purposes, although it will be understood that devices other than keys can be used to provide inputs to the input device. A pressing of the corresponding key in the respective key set 108, 110 or 112 will activate the corresponding function from menu selection items A05-A09.

In one embodiment, the multifunction navigation device can include tactile feedback elements. When one of the actuators of the input device 104 is pressed, or moved in the case of a navigation style control or joystick, the keys can be configured to provide a "click" when the key is depressed sufficiently or moved to the desired location. This could involve using the input device 104 to move a cursor on the display 114 of the output device 106 to a desired or active location. The "click" could be in the form of feel, i.e. the user can detect the click by feel, or in the form of sound, i.e. the user can hear a click. This type of tactile feedback provides mechanical guidance with respect to the movement of the keys and the selections or choices. The tactile feedback and mechanical guidance can limit the movement of the multifunction navigation keys to the main directions, and thus allow eyes-free or heads-up interaction with the device when making selections.

In another embodiment, the length of time a key is pressed can also be used to determine an action or function. For example, in one embodiment, the state menu system can assign more than one function to the designated regions. A short pressing of the key on the keypad associated with state menu region can activate or call one function, while a longer press can activate or call another function. The regions or areas of the state menu could display this selection possibility by highlighting one of the selections on the state menu, the highlighted selection being the one that requires a pressing of the key for a different period of time than the first. The highlighted sections can also be configured to provide the opacity described with reference to the state control menu.

Generally, the state control menu will be used to promote and make readily available, the most commonly used functions used in connection with an application. For example, in a media application, functions that might be common used can include for example, playback control, media functions and media switch (switching between media types). Each of these functions can include one or more controls that a user may wish to readily access. For example, the playback functions shown in the menu A03 of FIG. 2A will be directly mapped to the keys 108-112 of the device 100 of FIG. 1. The media functions might include the functions that are otherwise generally accessed from an Options menu related to the particular application. For example, referring to FIG. 2B, a screen shot of an exemplary media application is illustrated. In screen B110, the Options field B112 generally allows the user to select and activate functions pertaining to playback capabilities. The disclosed embodiments, however, will enable a user to access these functions, with fewer key presses and less user interaction. The functions are easily displayed in one or more menu state screens on the display that allow access to the various functions.

The state control menu system is not limited to any one particular application or media type. The same functionality can be provided with respect to different media types, including for example, images, videos, music, podcasts, broadcasted media, games and the like. The state control menu system is also not limited to the particular type of key or input device arrangement. Although the embodiments herein are described with respect to a 4 or 5-way multifunction key set, in alternate embodiments, any suitable input arrangement can be utilized. For example, the state control menu system can be used with a device that includes a touch screen display, hard media keys or devices without hard media keys. The state control menu system could also be used in conjunction with a standard style keyboard and make use of function or hot keys.

In one embodiment, a key on the input device 104 of device 100 of FIG. 1 is designated as the state menu selection key. Generally, any one or more keys on the device 100 can be used for state menu activation and/or selection. The key could be a hard key, such as the # or * key, or alternatively could be a function or soft key. For example, in one embodiment, when an application is initiated in which state menu selection is available, the function associated with a soft key, will be assigned the state menu selection function. An icon or text near the particular key might be displayed to advise the user of the function of the designated key and the availability of the state menu system. Voice activation can also be used.

Figure 2B:
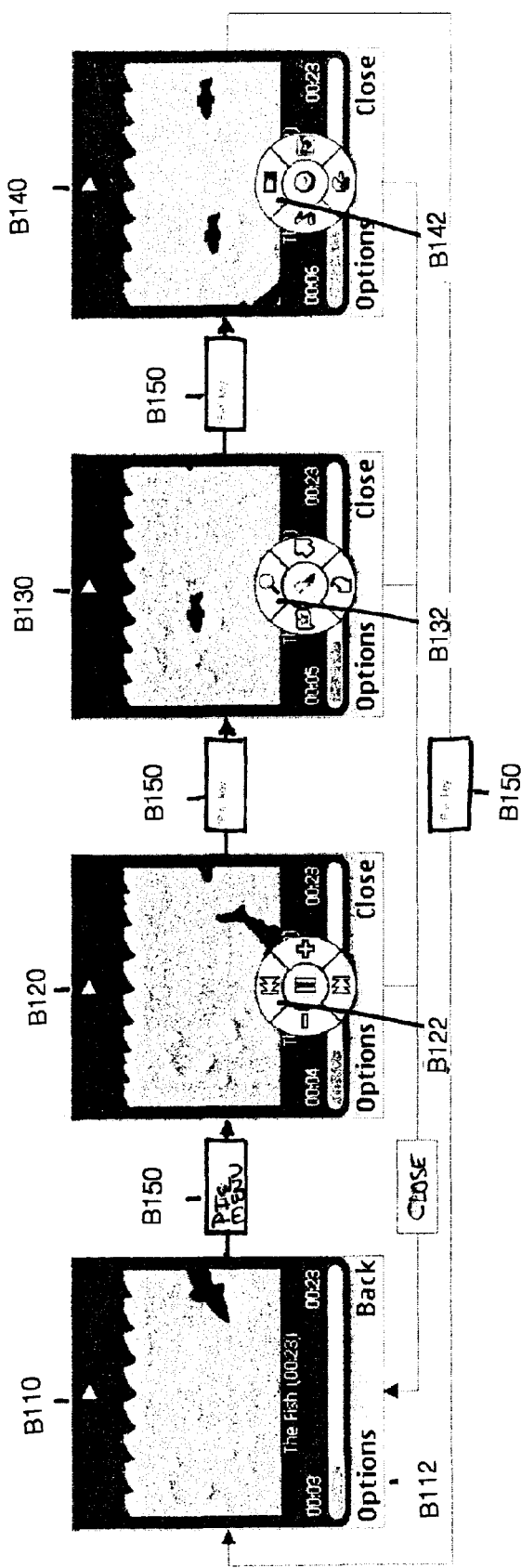
FIGS. 2B and 2C are screen shots of aspects of the disclosed embodiments.

Activation of the designated state menu key will toggle or switch between different state menu states. While the same key can be used to activate and toggle between different states of the device 100, in one embodiment, two keys can be used to toggle between states. One key could be used to activate or deactivate the particular state menu, while another key can be used to toggle between the state menu states. For example, in one embodiment, the state menu system is a three-state menu control system. For each application, the user will have available at least three different state control menus. Each activation of the designated state menu key will access a different state control menu. Although only a single state menu activation key B150 is shown in FIG. 2B, in alternate embodiments, the state menu activation key can comprise one or more actuating devices, or components thereof, or keys. For example, with reference to FIG. 2B, in the initial state B110, a state control menu is not visible. Activation of the designated state menu key B150 will enter the state menu control system and a first state menu B122 will be displayed in screen B120. A second press of the state menu key B150 will result in a second state menu B132, shown in screen B130. A third press of the menu state key B150 toggles the state menu to the third state menu B142 in screen B140. A final and fourth pressing of the key B150 closes or times out the state menu control system and results in a screen without a state menu, such as that shown in screen B110. Although a three-state menu system is described herein, the disclosed embodiments are not so limited, and any suitable or desired number of states can be implemented.

Figure 9:
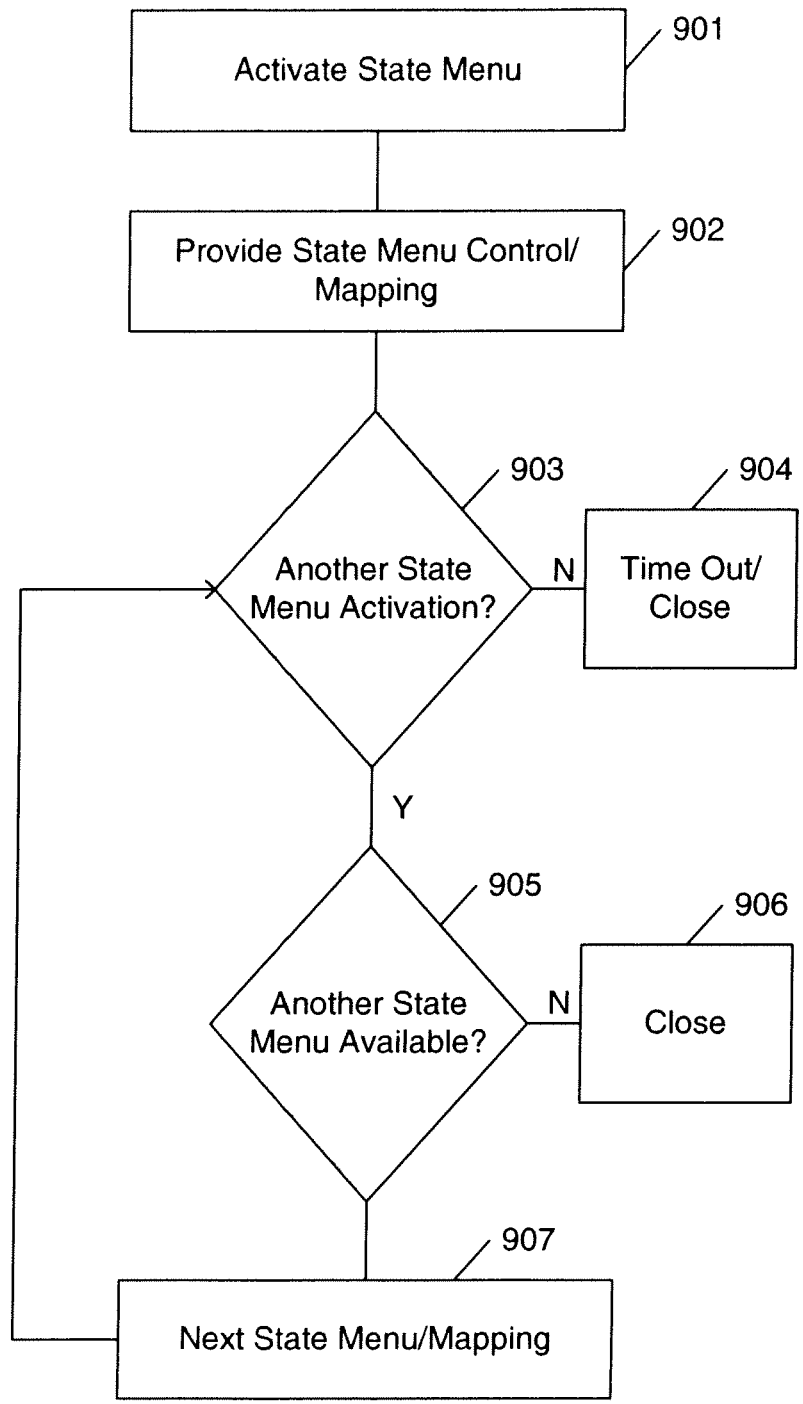
FIG. 9 illustrates a flowchart incorporating aspects of the disclosed embodiments.

FIG. 9 is a flowchart illustrating an embodiment of the state menu control system. The state menu control system is activated 901 and the state menu control is provided 902. It is determined 903 whether another activation of the state menu control system is detected. If not, and no activity is ongoing, the state menu control can time out or the system can close 904. If an activation is detected, it is determined whether another state menu control is available 905. If no, the state menu control system can close 906. If another state menu control is available, the next state menu control is provided 907.

The order, arrangement and types of state menu control that are displayed can be a function of the application as well as set by the user. In one embodiment, the system will initially determine the types of functions available from for example the options menu, and categorize each according to a predetermined criterion. The system can then make certain functions of the application or application mode available in one or more state menus according to the criteria. For example, one criterion might be the frequency of use of a certain function with respect to a particular application mode. The most frequently used functions can then be displayed in one or more state menus.

In one embodiment, the actions and selections offered in each state menu can be context dependent. Each menu can be tailored to the specific application and media, and different actions, including different graphics and labels, can be assigned to the various regions of the state menu and offered to the user. For example, if the media type is music, or songs, regions A06 and A08 of FIG. 2A can be assigned and display volume up/down controls. However, if the media type is pictures, the same areas A06 and A08 can be assigned and display different controls, such as for example zoom in/out controls, as shown for example in FIG. 2D.

Figure 2C:
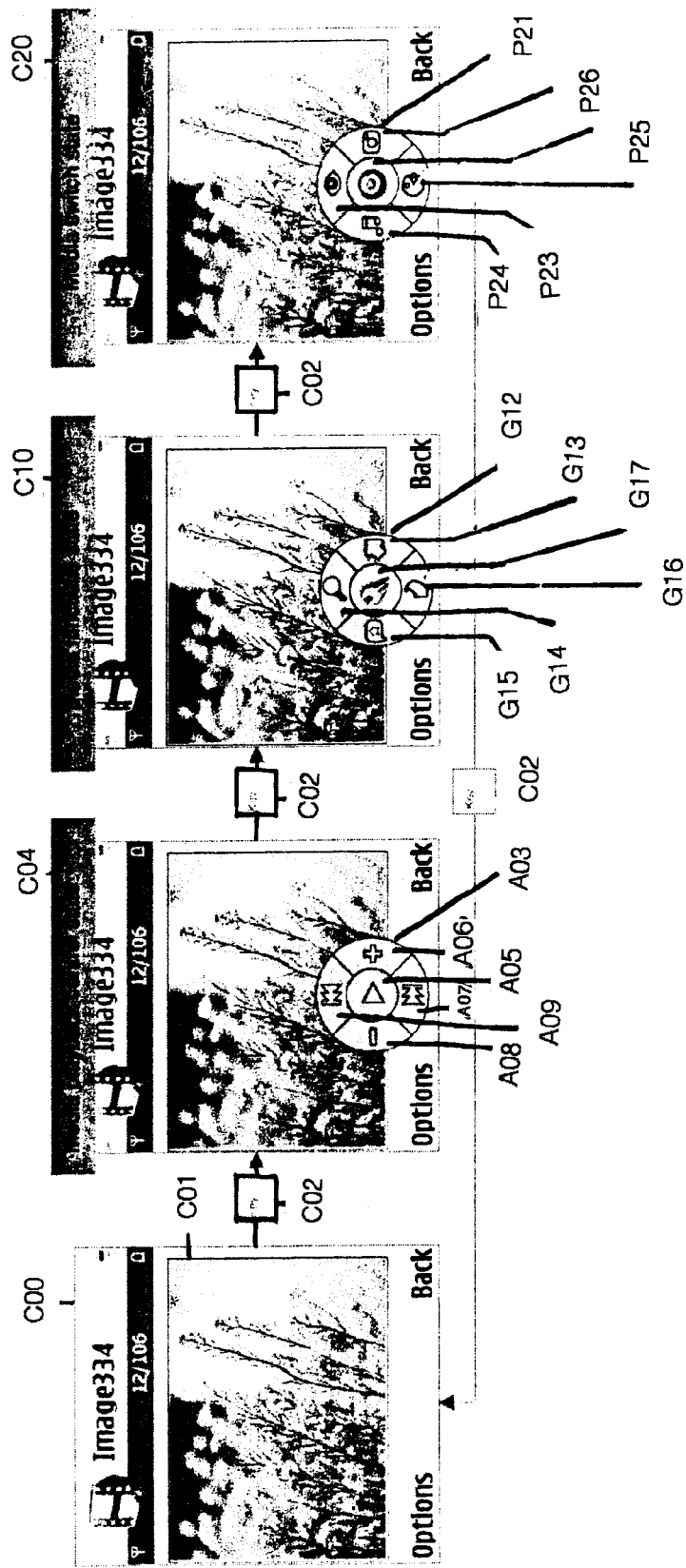
Figure 2D:
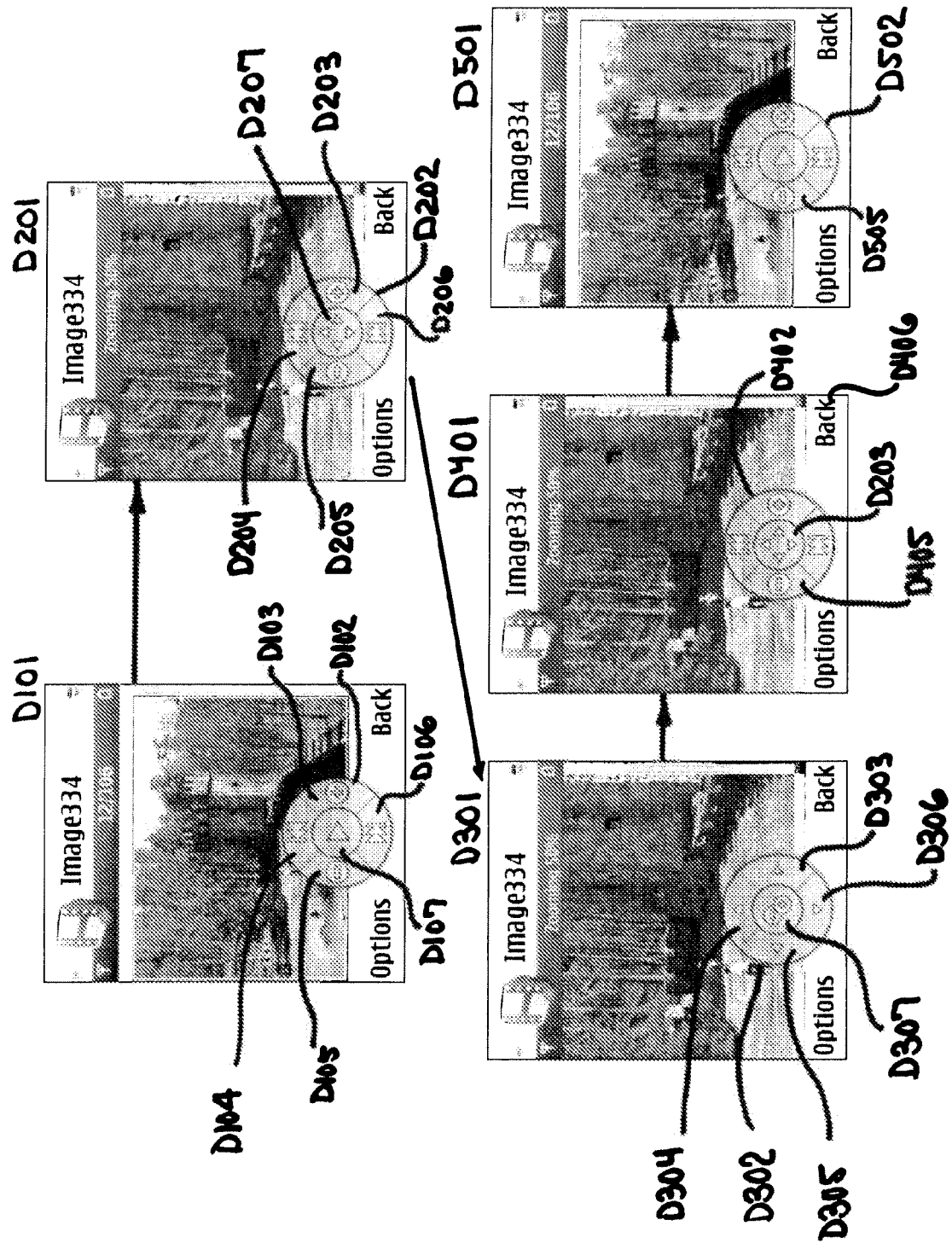
FIGS. 2D and 2E illustrate screen shots of an application of the zoom functions of the disclosed embodiments.
Figure 2E:
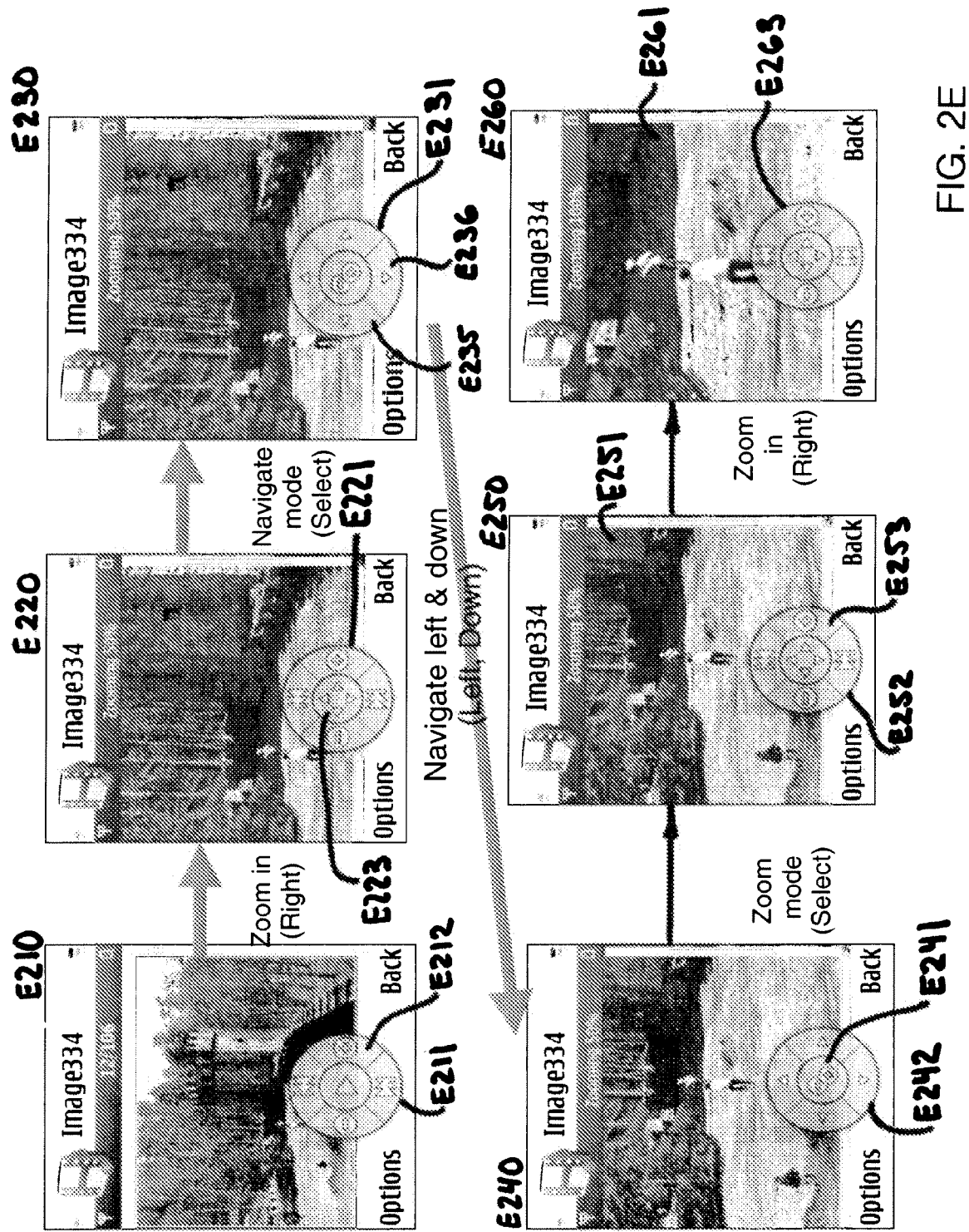

The navigation controls of the state menu control illustrated in FIGS. 2D and 2E provide an easier and more efficient manner to navigate around, including zooming in, out and around an image. As shown in FIG. 2D, in screen D102, state menu control D102 is active. In a normal view mode, as shown in screen D102, the control located in the upper position on the menu D102, referred to as the "up" control (<<) D104, is configured to open the previous image. The control located in the lower position on the menu D102, referred to as the "down" control (>>) D106, can open the next image. The "select" control (>) D107, located in the middle region of the menu D102, can be configured to start a slide show or other content playback. The left side control (−) D105 can be configured to zoom out view from the current image, while the right side control (+) D103 can be configured to zoom in on the current image. An activation or pressing of the control corresponding to a zoom function can cause the state menu control D102 to change to a zoom mode state menu control D202 as illustrated in screen D201. It should be noted that the arrangement of controls described here with respect to the navigation and zoom controls is merely exemplary, and in alternate embodiments, the locations of the function areas, or function control icons associated with controls D103, D104, D105, D106 and D107 can be arranged in any suitable or desired manner in or around the state menu control D102.

In the zoom mode, the up control D204 can be configured to open the previous image while the down control D206 can be configured to open the next image. Activation of the select control D207, which now includes a graphic different from that displayed in the state menu control D102, can switch to a navigation mode of the state menu control D202. The left control D205 can activate a zoom-out function, while the right control D202 can activate the zoom-in function.

Selection of the select control D207 of screen D201 allows the user to navigate about and manipulate the zoomed image and changes a configuration of the state menu control D202. As shown in screen D301, the state control menu now includes icons that correspond to up, down, left and right movement or panning functions. The up control D304 allows the user to navigate in an up direction on the zoomed image. The down control D306 allows the user to navigate the zoomed image in a down direction. The left control D302 will navigate the zoomed image left, while the right control D303 navigates the image in the right directions. The left, right, up and down directions are relative to the image as displayed on the device. In those devices where the input device allows more precision control and more degrees of motion, the navigation controls can be configured to navigate the image in intermediate directions, other than including left, right, up and down.

Activation of the Select control D307 while the state menu control D302 is active will return the user to the Zoom mode described with respect to the state menu control D202 of screen D201, as shown in screen D401 with state control menu D402.

To return back to the normal view mode, as shown in screen D101, the user can press the left function D405 of control D402 to zoom out or press "Back" D406 multiple times to return to the normal view mode, as shown in D501.

FIG. 2E illustrates an example of the zooming navigation function in conjunction with the state menu system. As shown in E210, in the normal view mode, the user selects the zoom in control E212 of state menu control E211. Screen E220 illustrates the zoomed view, and the state menu control E221 is now in the navigation mode. While in the navigation mode, the select control E223 is activated in order to activate the zoom mode. Screen E230 illustrates the state menu control E231 of the zoom mode. Using the navigate left control E235 and navigate down control E236, the user can navigate the image E231 of screen E230, with a resulting image as shown in screen E240. Activation of the select control E243 of the state menu control E242 switches from the navigate mode the state menu control E242 to the zoom mode with the state menu control E252 shown in screen E250. Using the zoom-in control E253 (e.g. right control +), the user zooms in on, or magnifies, the image E251 of screen E250 which results in the image E261 of screen E260. Once again it is noted that the particular layout and arrangement of the zoom navigation controls is exemplary, and in alternate embodiments, any suitable arrangement or layout can be utilized.

The use of a single state menu identification key minimizes the need to allocate additional keys on a keyboard of the device for all of the different functions associated with an application. However, in alternate embodiments one or more keys or actuators can be used. The repeated activation, such as for example pressing, of the state identification key toggles the state menus between the active states, and closes the menu after all states have been offered and/or presented. In the examples illustrated herein, three active states are used, and the repeated activation of the state identification key toggles the state menu between each of the three states, and closes the state menu after the third activation.

The state menu system of the claimed invention can be embodied on any type of application domain, such as for example media applications, mobile web browsers to open a search, a URL, or bookmark. Application devices can include for example communication devices, media playback devices, or mp3 devices. While the disclosed embodiments are generally directed to small screen devices, the state menu control system can be implemented in an on any computing device where media and content playback is desired. This can include computers for example. Small screen devices will generally include a smaller display interface than larger computing devices, and may also have 4 or 5-way multifunction controls or actuators, which highlights the advantages of the state menu control system.

As shown in FIG. 2B for example, the state menus can appear in a partially transparent or translucent form on the display of the device. Each of the state menus B122, B132 and B142 are configured so that the screen area that is behind each state menu is at least partially visible. In this manner, the state menu does not obscure the underlying content of the active display. This also reduces the amount of display or user interface real estate that is needed in order to access and activate each of the functions associated with the particular application. In alternate embodiments, the form of the state menu on the display of the device can be any suitable form.

Referring to FIG. 2C, in one embodiment the active application is a media application and an image is being viewed on the display C01 of the device. In this particular example, the image is a picture or photograph. In alternate embodiments, the image can comprise any suitable media, such as video for example. By activating or pressing key C02, the pie menu A03 is activated and displayed on the screen or display C01 of the device. This particular state of the menu A03 is a media playback control state. In one embodiment, the device recognizes that the image is a type of media and offers a media playback control state C04 as the first menu state upon activation of the menu activation key C02.

As shown in FIG. 2C, in the first state C04, the media playback control state menu A03 provides access to various media playback functions available in the device. FIG. 2A illustrates an exploded and more detailed layout of the menu A03 of the media playback control state C04 illustrated in FIG. 2C. As shown in FIG. 2A, the controls A05 to A09 correspond to Play/Pause, Volume Up, Next (Forward), Volume Down, and Prev (Rewind), respectively. These control functions of menu A03 generally correspond to the basic playback and volume controls associated with the media playback control state A03. Each of these functions A05 to A09 is then mapped to a corresponding actuator such as a key or button on the device.

Figure 5:
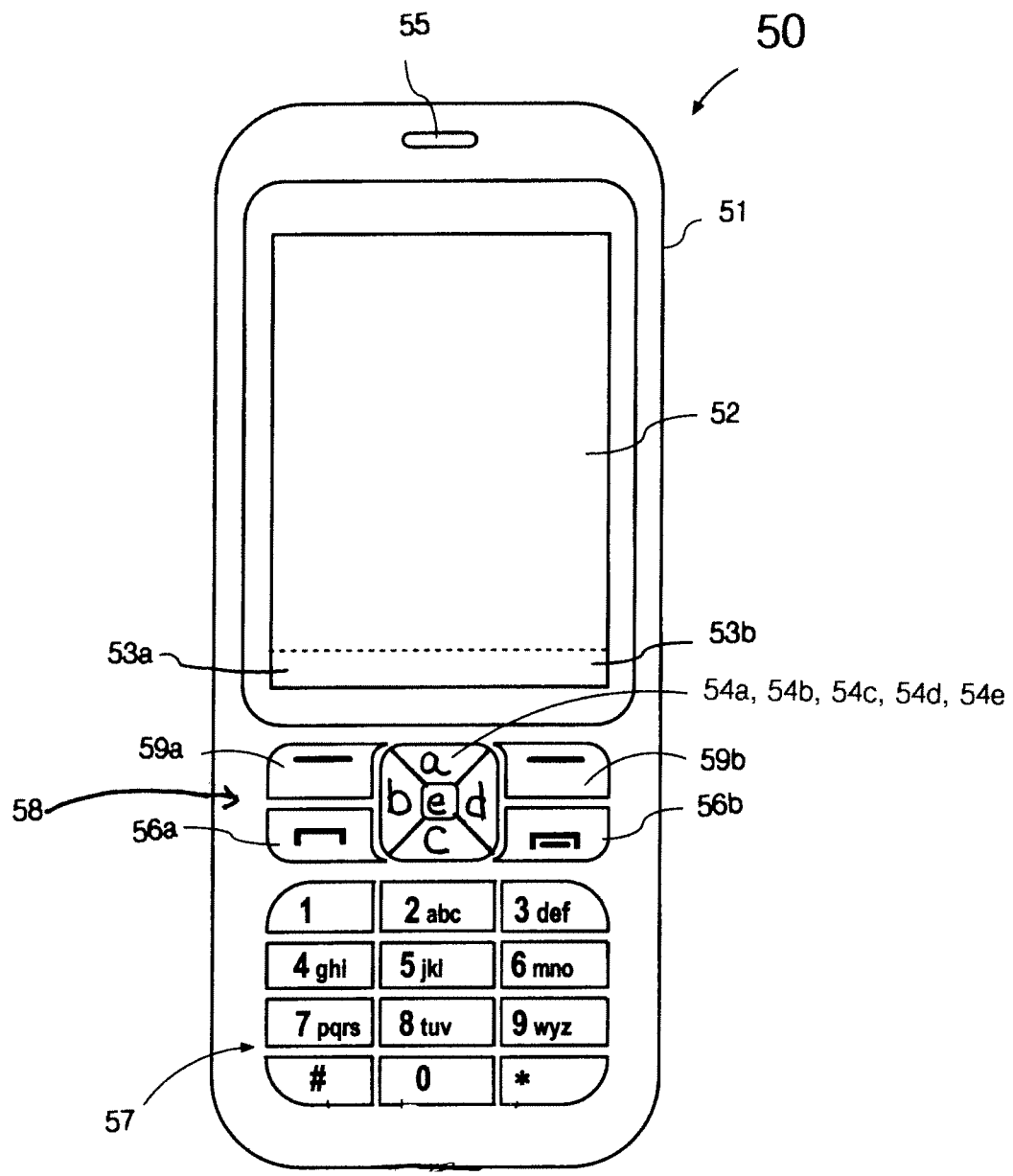
FIG. 5 illustrates one example of a device in which aspects of the disclosed embodiments can be practiced.

The functions associated with regions A05-A09 are merely exemplary, and can be modified, configured and arranged as needed. For example, the control functions of the menu A03 can change or vary for different media types. For example, for images, the Select button A05 can be used to start or pause a slideshow. In another example, the left and right keys A08, A06, might be used to zoom in and out. If the media playback is related to broadcast media, the select key A05 might correspond to a time-shift on/off. These media playback functions can be mapped to keys of the device. In one embodiment, the media playback functions that are displayed on the menu control A03 are mapped to a 5-position cursor control device. An example of such a device is shown in FIG. 5. As shown in FIG. 5, the device 50 includes a set of keys, each key corresponding to a function shown in menu A03, roughly based upon position. For example, control A05 can correspond to key 54e of device 50, while control A03 can correspond with key 54b of device 50. An activation or pressing of key 54e or key 54b, will activate the respective function A05 or A08. In alternate embodiments any suitable set of keys can be mapped to the functions of menu A03.

In one embodiment, if display C01 of FIG. 2C is a touch sensitive screen, contacting the display at a position of a displayed function or control can cause the respective function to activate.

As shown in FIG. 2C, the menu A03 is displayed as a partially transparent or translucent image or overlay over the primary image or application being displayed on display C01. The size of the control menu A03 is also such to minimize the obstruction of the primary or underlying image, while also providing an adequate size for viewing of the menu A03. The position for the menu A03 can also be set to be at the most desirable position, based for example, on the space occupied by the primary image, or user preference. The user of the device can set the appearance, size and position of the menu A03, for example. Alternatively, the device might detect a least occupied area or region of the display, and insert and display the menu in that position on the display. In one embodiment, the menu A03 might "hide" when not in constant use so as not to interfere with the viewing of the image. For example, in the playback mode, state C04, once playback is selected, function A05, the menu A03 can be caused to disappear from view. When a further function of the menu A03 is desired to be activated, any one of the mapped function keys could be activated, which would then cause the menu A03 to be redisplayed on the display C01. Alternatively, the user could merely tap the screen of a touch screen display to cause the menu A03 to reappear.

Figure 2F:
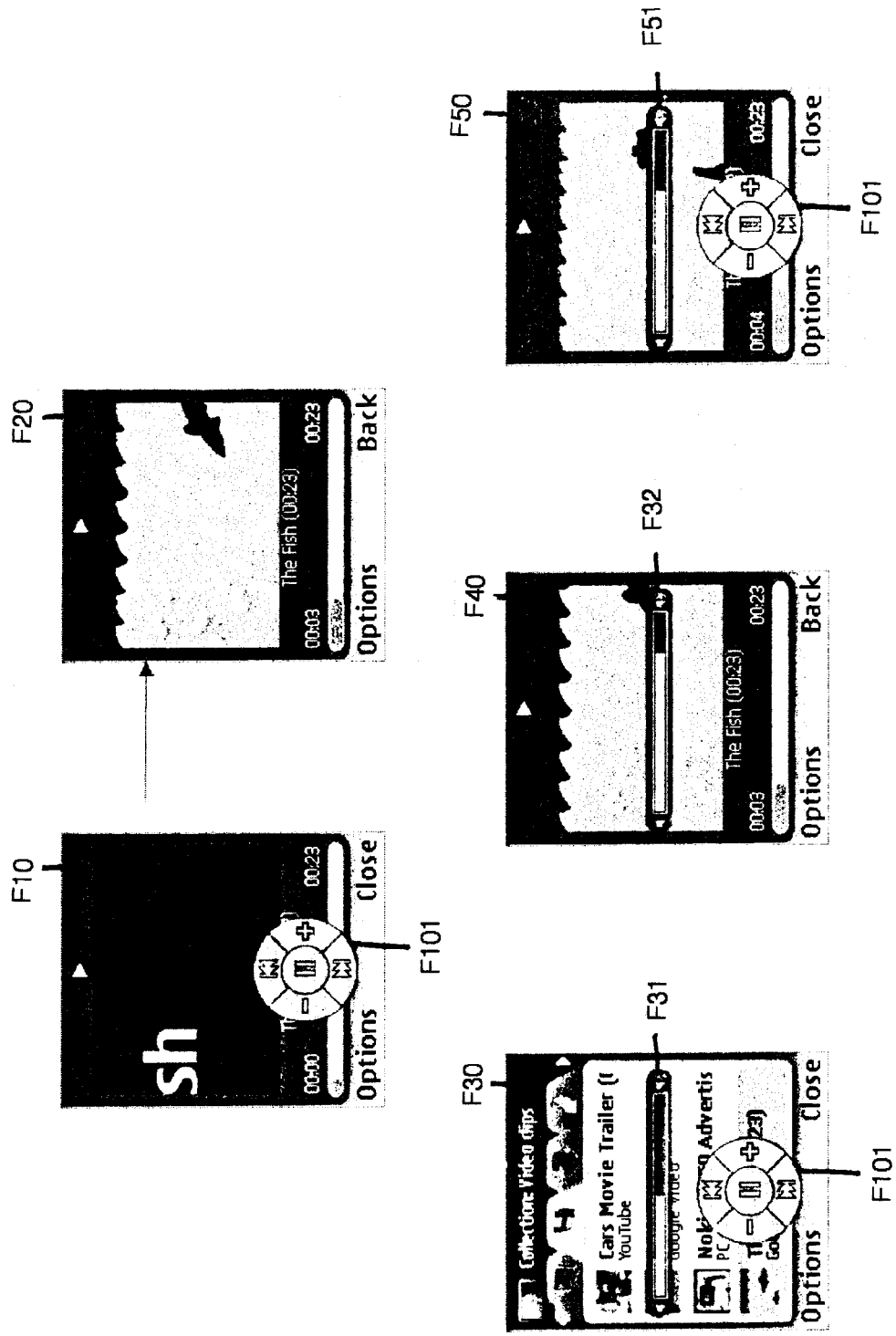
FIG. 2F illustrates screen shots of exemplary embodiments using the state control menu of FIG. 2A.

In one embodiment, referring to FIG. 2F, the playback control state menu F101 appears when an audio or video playback is started as shown in screen F10. However, after a few seconds or such other predetermined period of time, the state menu F101 disappears as shown in screen F20. The control functionalities can remain mapped to the corresponding keys of the device. If the user wishes to access one of the playback control state functions, the user can, in one embodiment, select or activate the desired key. For example, if the user wishes to adjust the volume, the user can press the key that corresponds to the volume control. The state menu F101 reappears, as shown in screen F30. In one embodiment, the activation of any key can cause the state menu F101 to reappear or wake-up.

In one embodiment, if the user selects a control associated with volume, a volume indicator F31 can be displayed. The user can adjust the volume using the keys corresponding to the state menu controls for volume up/down. The state menu can again disappear from the screen as shown in screen F40, and reappear if the control is again activated as shown in screen F50.

Figure 2G:
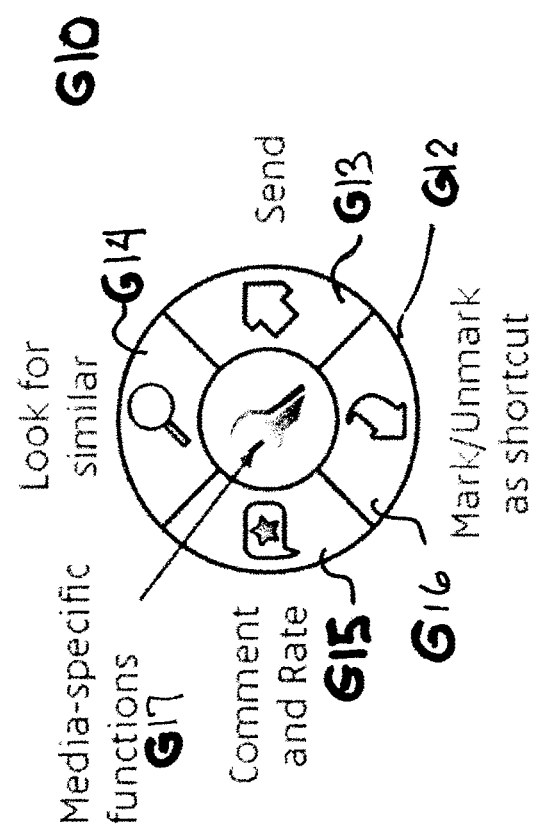
FIG. 2G is an example of one embodiment of a state control menu.

In order to move to another state associated with the image application, a subsequent press of the dedicated control menu key will cause a change of state. For example, referring to FIG. 2C, once in the media playback control state C04, a second or subsequent press of key C02 will cause a state change to a media functions state C10. Again the principal functions associated with this state C10 are displayed in the control menu C12. FIG. 2G shows a more detailed illustration of media functions state control G10. In this example, four similar function themes for each media type (G13-G16) and one media-specific function (G17) are mapped directly to the keys of the device. The Find or Look for Similar function G14 can look for similar content to the current media item. This can be, for example, a meta-data based search that does not require the user to type a search criteria in. This can be, for example, a simplified and quick way to create smart play lists. The GIVE or SEND function G13 can correspond to a share, send or recommend current media item capability. The sharing options can be based on the digital rights management protection of the media item. MARK or UNMARK G12 can correspond to a mark/unmark shortcut function that provides a quick way to add/delete media items to/from a shortcuts list. The "Comment and Rate" function G15 may allow the user to rate and comment on the current media item. These ratings and comments can be used for both personal usage and online services, for example. The "media-specific" functions might be for most often used functions for a specific media type. These can include, for example, music shuffle on/off, an image open image editor.

These functions G13-G17 associated with menu G10 can be pre-determined by the associated applications or pre-set by the user. Alternatively, the device may select the most commonly used functions associated with a particular state based on, for example, past user behavior. In alternate embodiments, any suitable mechanism to determine the nature of the functions or tools to be displayed and available via menu G12.

Figure 2H:
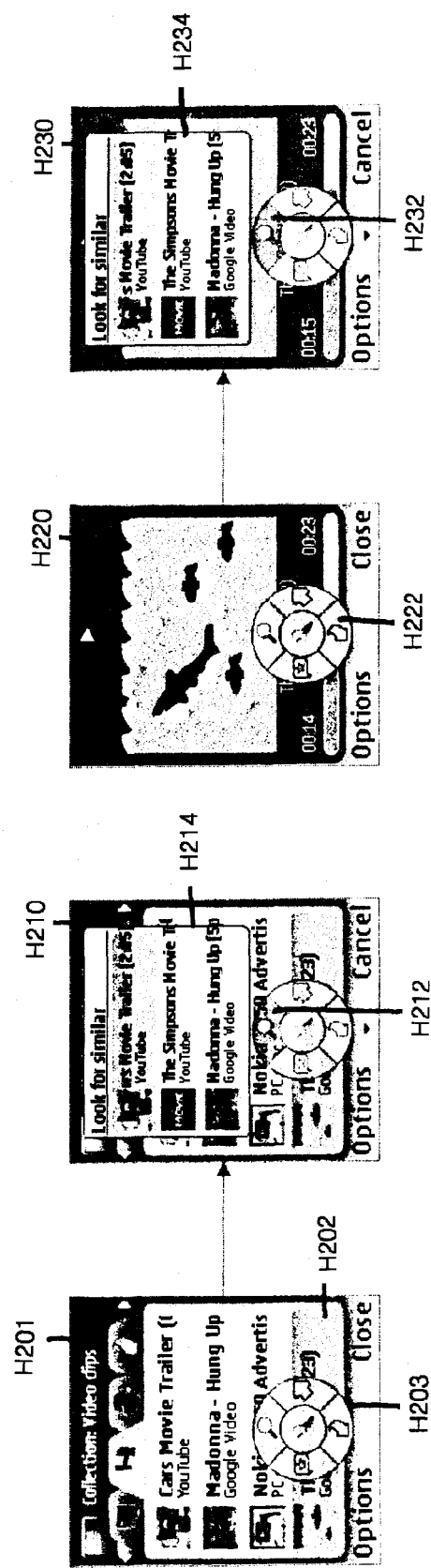
Figure 21:
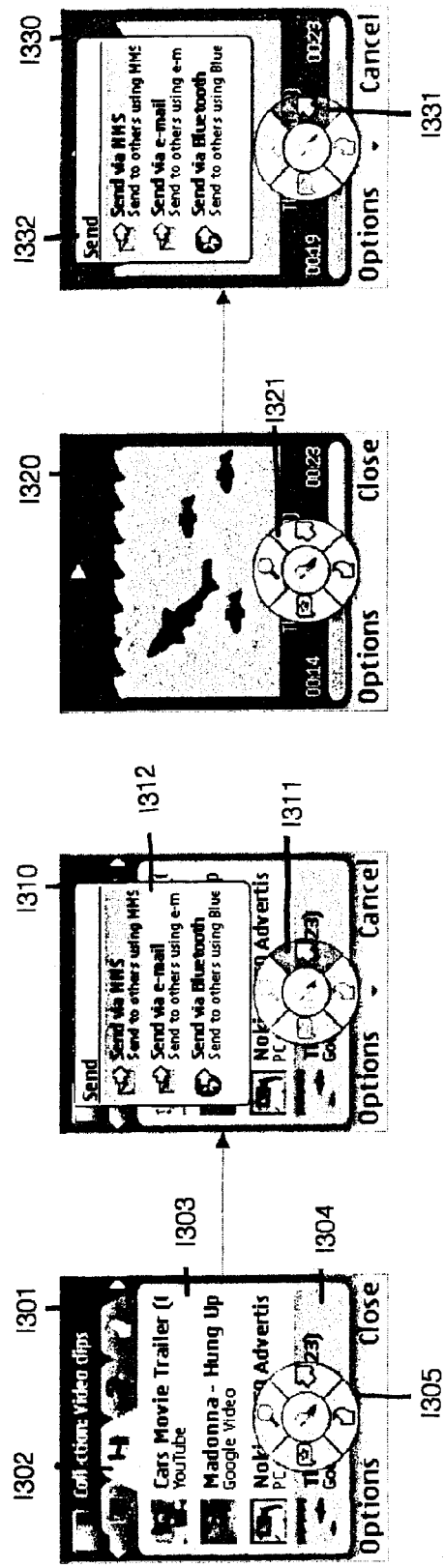

FIG. 2H is one illustration of the Look for Similar function G14 of the media functions state G10 shown in FIG. 2G. Screen H201 shows a list of video clips, where the media functions state menu H203 is active. Selection or activation of the FIND/Look for Similar region H212 of the menu H203 performs a search for similar media types. The search can comprise a metadata-based search, and there is no need for the user to separately type in or input additional search criteria. This function can be used as a way to create playlists of similar types of music, for example. In alternate embodiments, keyword search functionality could be used to supplement and enhance the Find/Look for Similar function.

The search can also take place from the playback mode. In screen H220, a video clip is being played, while the media functions state menu H222 is active. Selection of the Find/Look for Similar function H232 will activate the search function and a list H234 of similar media types will be generated as shown in screen H230.

Referring to FIG. 2I, one example of the Give or Send selection control G13 of FIG. 2G is illustrated. Generally, this control pertains to the ability to send or recommend current or active media item. While the description herein is to store or save content, the same functionality can be applied to online or broadcasted content.

For example, as shown in FIG. 2I, in screen I301, the active application is a video clip application, as indicated by the highlighted tab I302. A list I303 of video clips available for selection is generally presented on the screen I301. A particular video clip I304 has been selected and the state menu I305 related to the media functions state is currently active. The Send or Give control I311 is selected as shown in screen I310. In conjunction with the selection/activation of control I311, a list I312 of possible sending options is displayed. In one embodiment, the list I312 of sending options can be based on the available connectivity options, the media item type, or the digital rights management (DRM) of the particular media item. In alternate embodiments, any suitable criteria can be used for the sending options, including for example, manually selecting sending options from a pre-determined or user/service provider created list. Alternatively, the contacts list could directly include the sending options, and the user could choose the sending method manually or automatically, after choosing the recipient. For example, in one embodiment, the device could detect that the recipient has a certain service provider active and with a certain range, and then send automatically using that service provider.

In screen I320, the active application is now the actual playing of the media, in this example video, content. Again, the state menu I321 related to the media functions state is currently active. The activation/selection of the Give/Send control I331 presents the list I332 of available sending options.

Figure 2J:
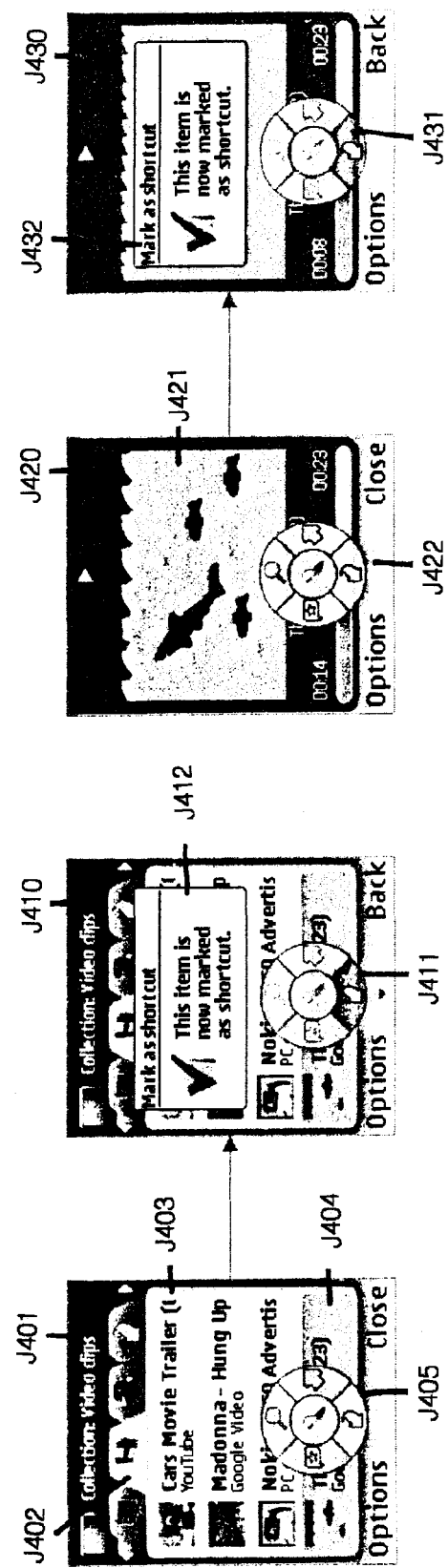

FIG. 2J presents examples of the use of the Mark/Unmark as Shortcut control G16 shown in FIG. 2G. Referring to screen J401, while in the Video Clip collection application as indicated by highlighted tab J402, a list J403 of possible selections is presented. A selection J404 is made and the state menu J405 related to the media functions state is active. As shown in screen J410, upon selection/activation of the control J411 related to Mark/Unmark as Shortcut, the selected item J404 is now marked as a shortcut. This action can be indicated by, for example, an activity confirmation screen J412. In alternate embodiments, any suitable confirmation can be used.

Screens J420 and J430 illustrate another example of the Mark/Unmark control G16 of FIG. 2G. In this particular example, the active application is the playback of video content. The state menu J422 related to the media functions control state is active. The Mark/UnMark control J431 is activated and the item, in this case the video clip, is marked as a shortcut, as evidenced by the confirmation screen J432. In one embodiment, marking as a shortcut can be replaced with tags.

Figures 2K, 2L:
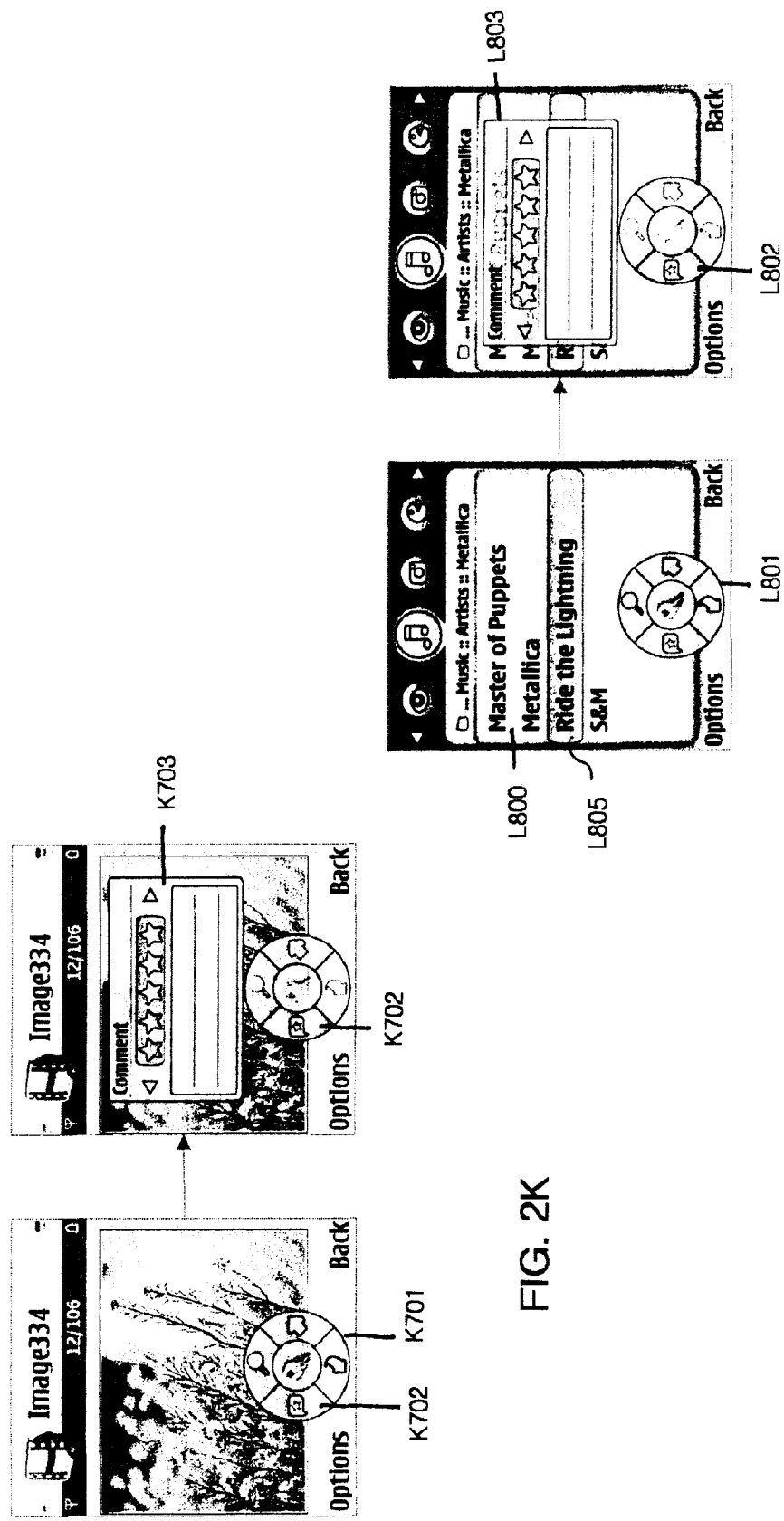

The state menu system of the disclosed embodiments supports the use of submenus in various modes. FIGS. 2K and 2L illustrate the use of submenus in the playback mode and the list mode. In FIG. 2K, the Comment/Rate control K702 of the media functions state menu K701 results in a sub-menu K703. In FIG. 2L, a list L800 is presented that presents items, in this example music selections, that may be highlighted and selected. The selection or activation of the Comment/Rate control L802 in this screen causes the activation of the submenu L803. The user can then enter a comment or rating on the comment/rate screen LGO3 corresponding to the comment/rate control L802. In this example, menu item L805 is highlighted and selected. The user can then enter a comment on screen L803 about this selection. In one embodiment, as shown in FIG. 2L, the screen L803, which can be presented as a pop-up menu, is at least partially transparent to allow continued viewing of the underlying screen or display content L800.

Figure 2M:
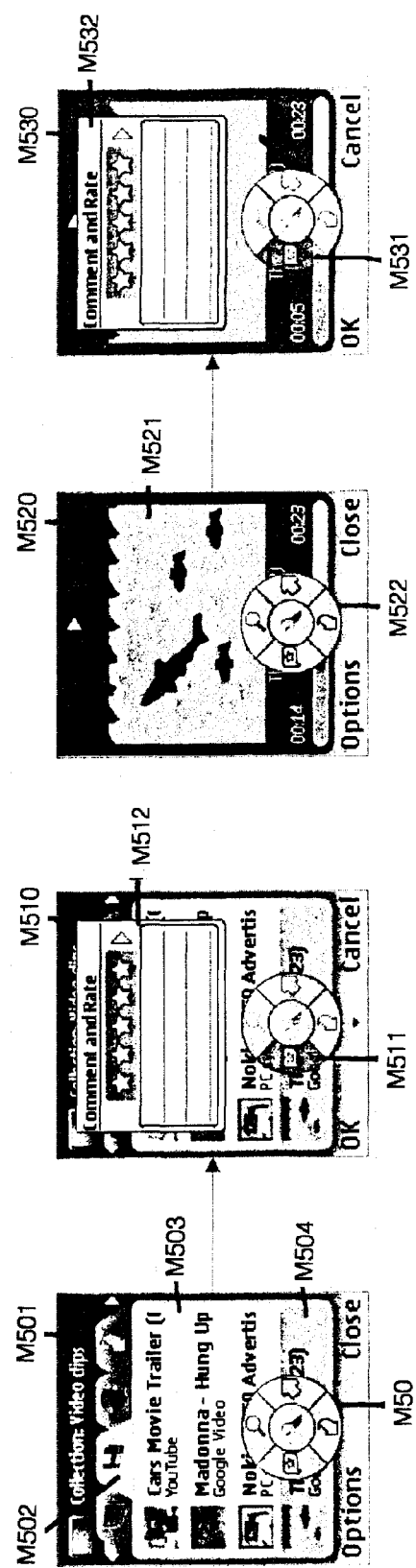

FIG. 2M presents examples of the use of the Comment/Rate control G15 shown in FIG. 2G. Referring to screen M501, while in the Video Clip collection application as indicated by highlighted tab M502, a list M503 of possible selections is presented. A selection M504 is made and the state menu M505 related to the media functions state is active. As shown in screen M510, upon selection/activation of the control M511 related to the Comment/Rate control, a Comment and Rate screen M512 appears in relation to the selected item M504. The user can then enter comments and other information into this area M512.

Screens M420 and M430 illustrate another example of the Comment/Rate control G15 of FIG. 2G. In this particular example, the active application is the playback of video content. The state menu M522 related to the media functions control state is active as shown in Screen M520. The Comment/Rate control M531 is activated. A comment and rate user input area M532 is displayed for the user to enter suitable information about the video M521. The information could be used for both personal usage and other online services, for example. Also, in one embodiment, the comments and ratings could be shared, or be available to be shared, with other functions, such as a search function for example, or with other users, even remote users. Such options might be selectable directly from the input area C532 or another menu selection item.

Figure 2N:
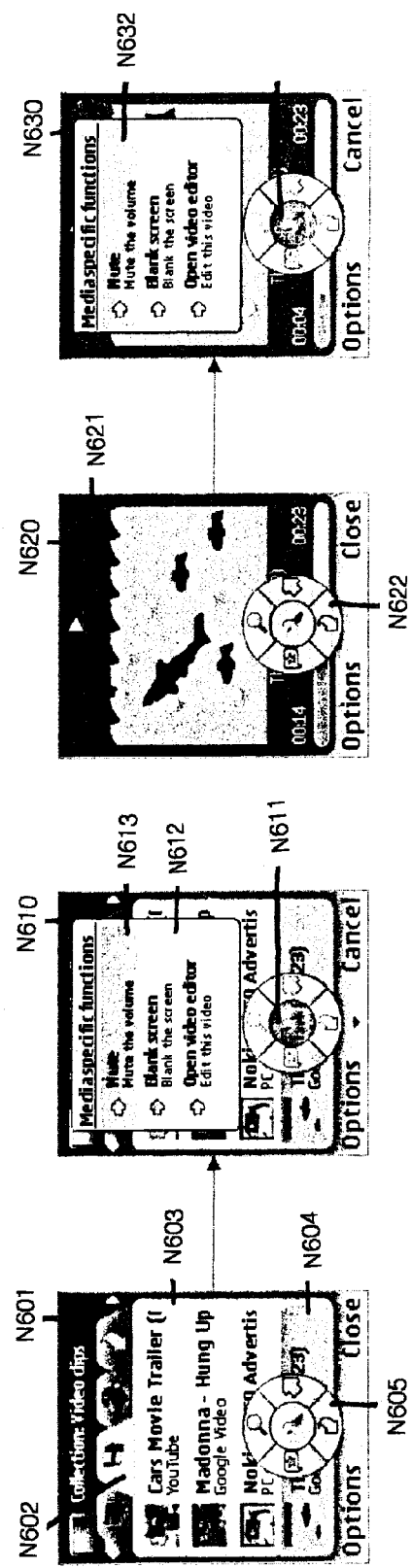

FIG. 2N illustrates some examples of the Media-Specific Functions G17, described with respect to FIG. 2G. The media-specific functions control N605 generally provides access to the most commonly used functions for a specific media type. Media types can include for example, audio, video, mobile TV, images and games. For audio media types, possible control functions might include mute on/off, shuffle on/off, repeat one/all/off, and view details. With respect to video media type, functions can include for example, mute on/off, blank screen on/off, open video editor and view details. For mobile TV, functions might include electronic programming guide (EPG), mute on/off and view details. For images, set as wallpaper, open image editor and view details are possible functions. In games, mute on/off and view details might be common functions. The foregoing is merely exemplary, and is not intended to encompass all of the possible media-specific functions or applications that can be used and available.

The state menu control system could also be used in conjunction with messaging programs or protocols. For example, instant messaging applications could utilize a state menu control system that provides access to the various messaging controls, such as for example, reply, forward, save, attach, insert. Other messaging applications might use similar functionality, each being with respect to the particular application. When a messaging application is active or activated, a corresponding state menu control can also be active. The state menu control will provide easy access to functions related to the messaging application or function. The state control menu can be context sensitive and display functions corresponding to the particular message state.

For example, in screen N601, tab N602 is selected and a list N603 of video clips is displayed. A selection N604 is marked and state menu N605 related to the Media Functions State G10 of FIG. 2G is active. When the media-specific functions control N611 is activated, a list N612 of available media specific functions is displayed. Selecting a control option, such as Mute N613, will activate the corresponding functionality. Similarly, with respect to the video clip N621 in screens N620 and N630, activation of the control N631 of the media functions state control menu N622, will make available one or more media specific functions N632 to the user. In one embodiment, the controls N631 can also be configured to select and/or activate functions without a selection list, such as for example, view details.

Referring again to FIG. 2C, a third pressing will cause the state of the menu to change to a media switch state, C20 related to this particular image application. A menu control C21 will be presented allowing the user to select and activate any one of the functions C22-C26 associated therewith.

Figure 2P:
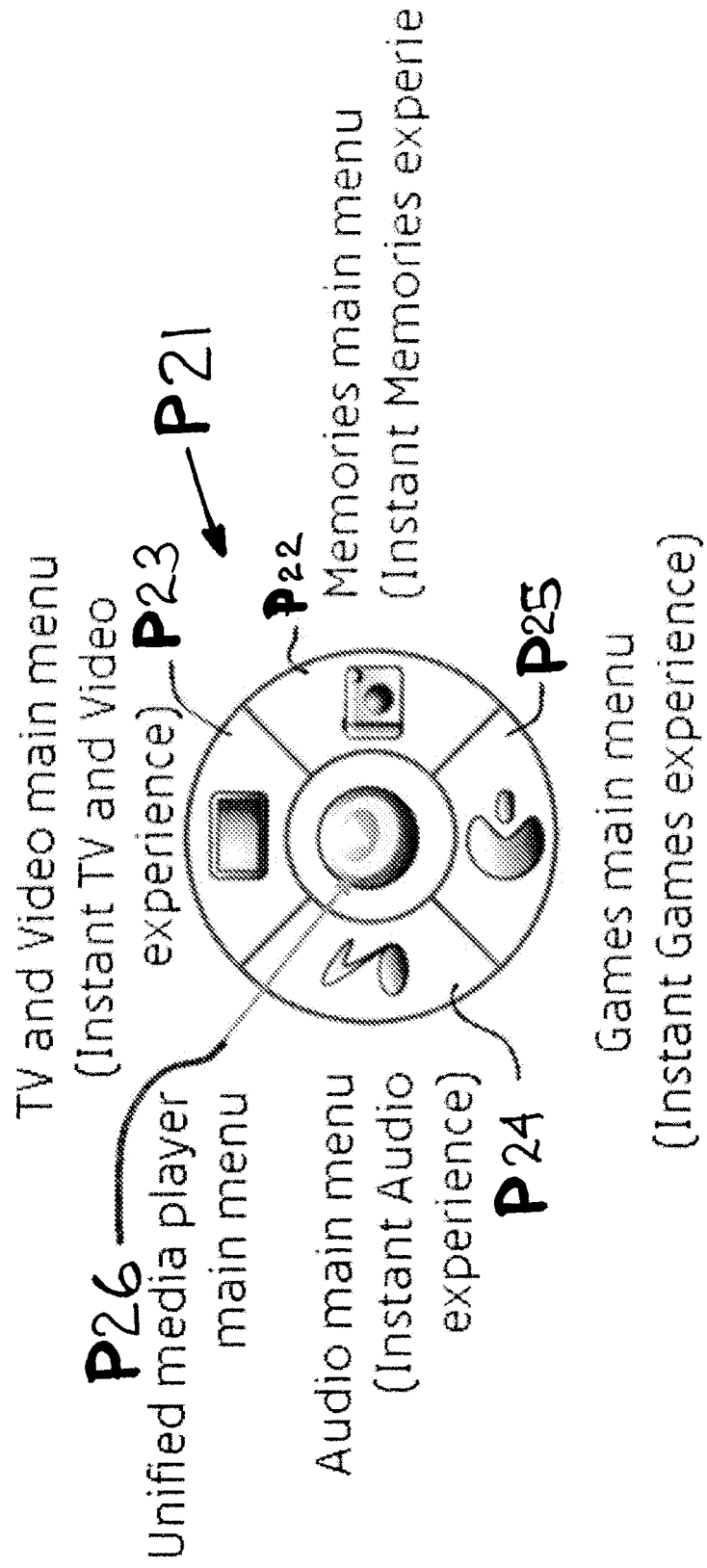
FIG. 2P is an example of one embodiment of a state control menu.

FIG. 2P is an exploded illustration of the media switch state C20 of FIG. 2C. As shown in FIG. 2P, the Media switch state control menu P21 can include for example a See Main Menu or Memories main menu control P22, a Watch (e.g. TV and Video) Main Menu control P23, an Audio Main Menu (Instant Audio experience) control P24, a Play or Games main menu P25 and a Unified Media Player control P26. In alternate embodiments, the Media Switch State control menu P21 can include any desired or suitable control functions. Each of the control functions P22-P26 will be mapped to a switch, key or button on the device 100 of FIG. 1.

In one embodiment, the length of the pressing of a key corresponding to the respective selected control can be used to associate and/or activate one of a plurality one of functions that can be associated with each key or other input device. For example, the device 104 and any one or more of the controls 108-112 of FIG. 1 can be configured so that a press or activation of a short duration will open the main menu of the selected category, while a press or activation of a longer duration opens or makes available a different function. For example, a short duration press of the key corresponding to the TV and Video main menu control P23 of FIG. 2P will open the main menu for the TV and Video selections. A long or longer duration press of the key associated with control P23 can open the instant experience of the selected category, such as for example the currently playing song, the last watched TV channel, or latest photo or image. In another embodiment, the longer duration press can cause the selection of a dynamic item from the category based on the User's settings or preferences.

Figure 2Q:
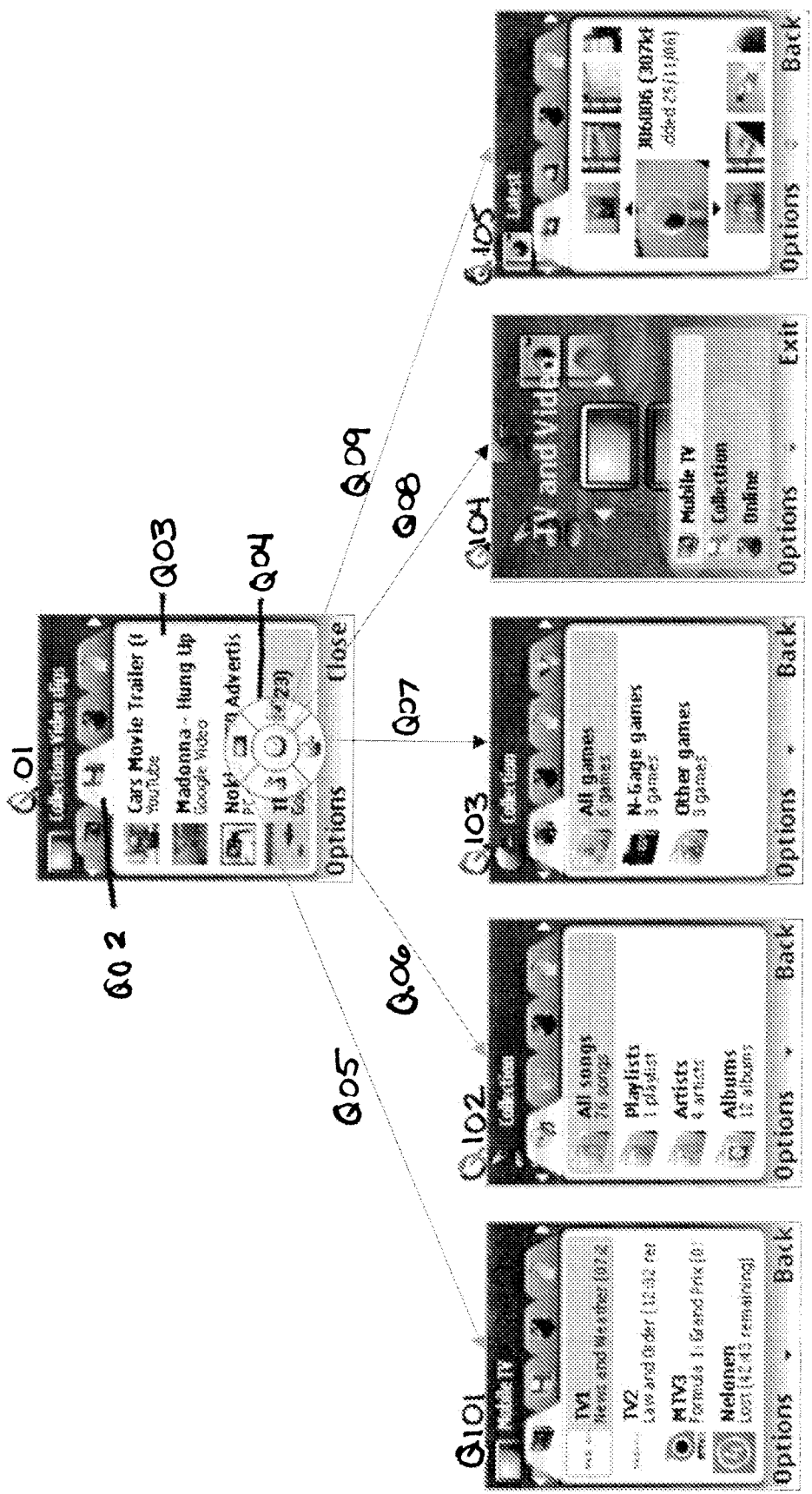
FIGS. 2Q-2R are screen shots of exemplary applications of the control functions associated with the state control menu of FIG. 2P.

Referring to FIG. 2Q, one example of the media switch state P21 of FIG. 2P is illustrated, using the short duration press option with respect to key presses. The user has accessed, in screen Q01, the Video Clip collection, by selecting the tab Q02. A list Q03 of available video clips is displayed and the media switch state control menu Q04 is active.

A short duration press of the key associated with menu control item Q05 (TV and Video) results in a listing Q101 of TV and Video selections. A short duration press of the key associated with menu control Q06 (Audio) results in a display Q102 of a listing Q202 of audio selections. A short duration press of the key associated with menu control item Q07 (Games) results in the display of a list of games Q103. A short duration press of the key associated with menu control Q08 (media player main menu) results in the display Q104 of TV and Video related selections. A short duration press of the key associated with menu control item Q09 (Memories) results in the display of a list Q105 of the latest images and clips.

Figure 2R:
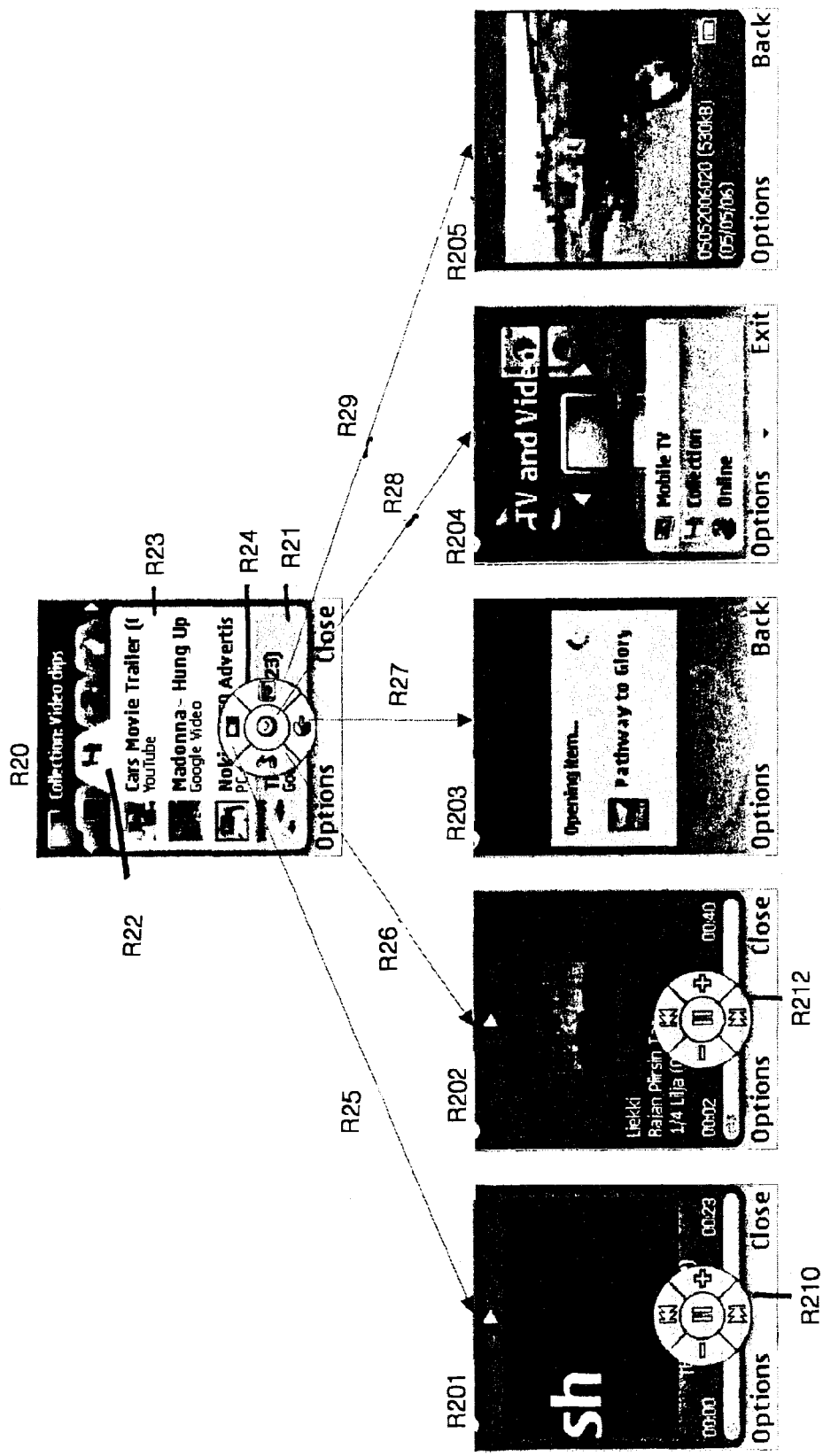

Referring to FIG. 2R, an example of the media switch state P21 of FIG. 2P is illustrated, using the long duration press option with respect to key presses. Again, although the duration of a press is being described herein with respect to keys, it will be understood that any suitable actuator can be used and the duration relates to a length of time the actuator is in an active or activate position. For example, with a toggle style switch, the duration could be with respect to a length of time the switch is held in one position.

In FIG. 2R, the user has accessed, in screen R20, the Video Clip collection, by selecting the tab R22. A list R23 of available video clips is displayed and the media switch state control menu R24 is active.

A long duration press of the key associated with menu control item R25 (TV and Video) results in the playing of the video R21 that has been played last. As shown in screen R201, the state control menu R210 for playback is active. A long duration press of the key associated with menu control R26 (Audio) results in the playing of an audio selection R202, which can include for example, the last played track. State control menu R212 is active. A long duration press of the key associated with menu control item R27 (Games) results in opening of a game R203. A long duration press of the key associated with menu control R28 (media player main menu) results in the display R204 of TV and Video main menu related selections. A long duration press of the key associated with menu control item R29 (Memories) results in the display of an image R205.

With respect to the example illustrated in FIG. 2C, a fourth press of the key C02 will cause a time out with respect to the state menu, and a return to the original image C00 without a state control menu associated therewith. It will be understood that the state menus illustrated with respect to FIG. 2C are exemplary, and any suitable or desired number of states can be implemented. In one embodiment, a pressing or activation of the key C02, or other suitable key, is not necessary to cause a time out. The state control menu can automatically close or time out after a pre-determined time period, or after an interval or period of time during which there is no activity, such as a pressing of a key or other user input.

Figure 3A:
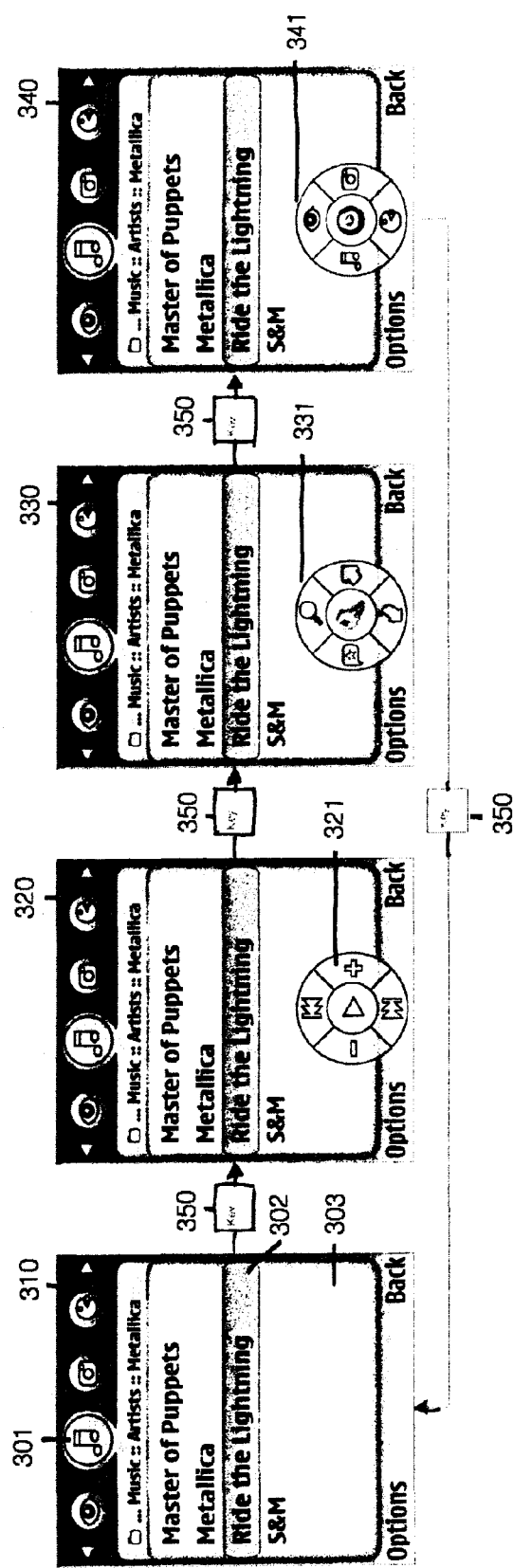
FIGS. 3A and 3B are screen shots of exemplary applications of the state control menu system of the disclosed embodiments.

FIG. 3A illustrates one embodiment where the user interface is operative in conjunction with a "List" mode of the device. The "list" mode will generally be understood to present for example, options, choices, selections and functions of the device or an application, for example. FIG. 3A illustrates an example of a list of music selections for a particular artist, while a media application is active on the device. In this example, the user is active in a media or music player application, as can visualized by the highlighted icon 301 of the device and has selected a particular music selection 302. The activation of a particular application and selection of an item from the list 303 can be in any particular manner, and may be particular to the device being used.

In the example of FIG. 3A, after having highlighted a particular item 302 in the list 303, the user presses or activates the menu state key 350. This key can be any key on the device that is identified as, and mapped to the menu state function. Generally, the menu state key 350 will be a dedicated key on the device, either as a hard key or a soft key. A first activation of the menu state key 350, in this media application, will activate or generate a media playback control state menu 321, for example. In one embodiment, the types of menu state control options that are presented upon each activation of the menu state key 350 can be pre-set by the user, or pre-determined by the particular application. In this example, the first activation of the menu state key 350 in the media application will open the media playback control state menu 321 as shown in screen 320. Activation of the menu state key 350 while the media playback control 321 is active will cause the media functions state control menu 331 to become active as illustrated in screen 330. The media switch state control menu 341 will become active upon activation of the menu state key 350, while the media functions state control menu 331 is active. A subsequent activation of the menu state key 350 will return the application display to the screen shown in 301.

When a particular control menu is visible, each of the functions displayed on the menu, for example, menu 321 in screen 320, will be mapped to corresponding keys of the device. However, if a menu is not visible, the associated control functions of a menu state are not mapped to corresponding keys, even if for example, the device is in a similar mode. For example, when the device is in a playback mode, the media playback control state functions are not automatically mapped to corresponding keys until the menu control 321 is displayed.

Figure 3B:
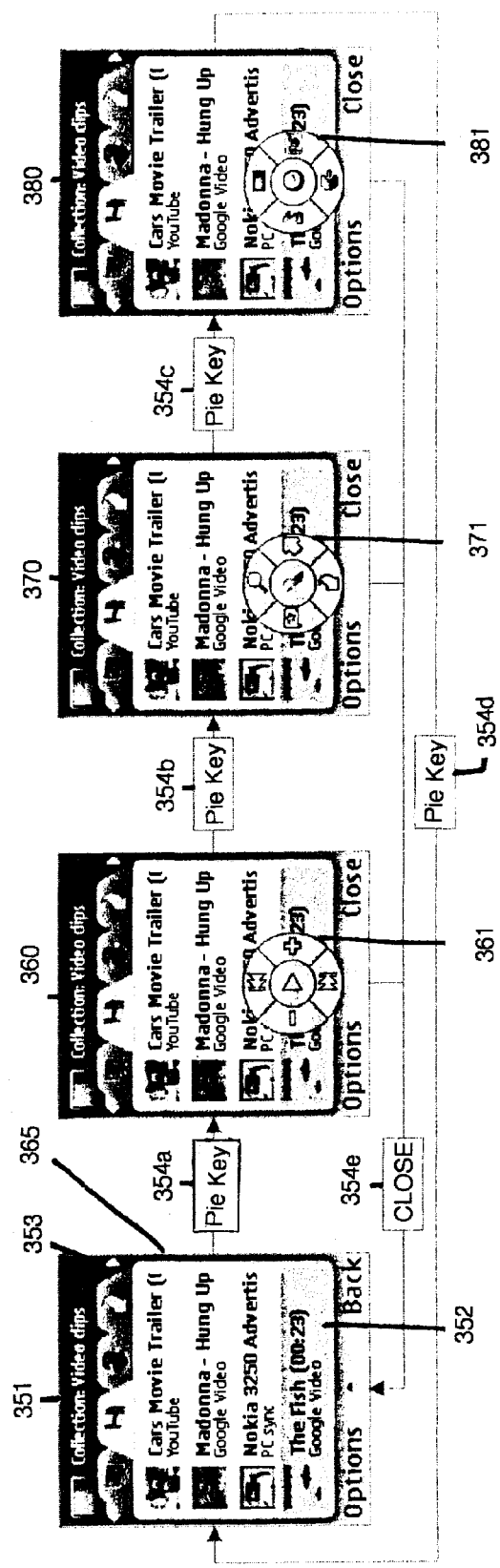

FIG. 3B illustrates another example of the application of the state menu system to a media application in the list mode. In this example, the list 365 of screen 351 comprises a list of media types, in this case video clips. Here again, the media playback control state is not automatically mapped to the multifunction navigation keys or joystick when the state menu is not visible. To open the folders displayed in the list 365, a select function is needed. To switch between tabs 353, a control, such as a left/right control is needed. The multifunctions state can be in active for folders. In this instance where a state is in-active, the control state menu, such as menu 371 in screen 370 can be displayed or presented in a dimmed, fuzzy or blurred state to indicate it is not available.

Figure 4:
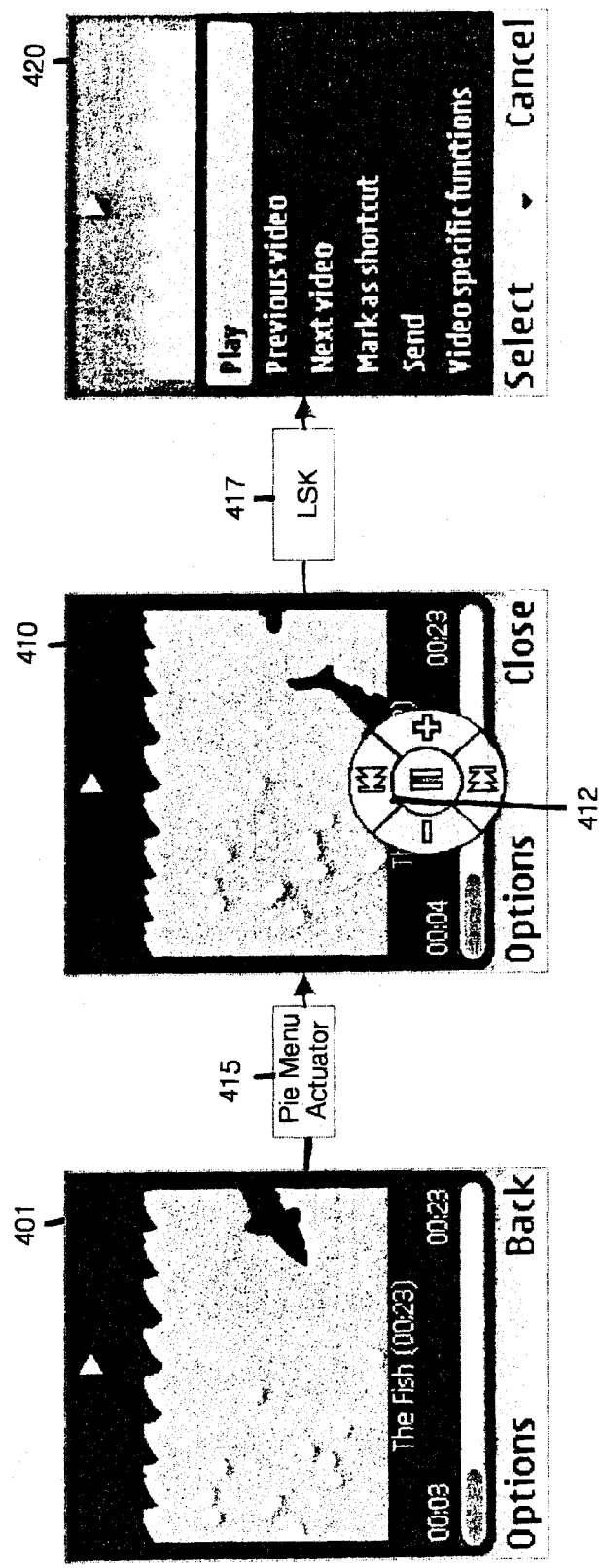
FIG. 4 illustrates screen shots of another example of the application of the state control menu system of the disclosed embodiments.

In one embodiment, it can be possible to shift from the state menu system back to the Options menu of the device. For example, referring to FIG. 4, in screen 401, a video clip application is active. Pressing the state menu key 415 activates the state menu system and the playback control state menu 412 is displayed in screen 410. Should the user wish to revert back to the Options menu of the application, it is not necessary to toggle through each of the available state menus. Rather, the pressing of a pre-determined key or sequence of keys, such as for example, the left shift key 417, can revert the application display back to the Options menu as shown in screen 420. Upon the activation or selection of the left shift key, the state menu 412 is closed, and the Options menu is opened. This same functionality is applicable with respect to other playback applications of the device, such as for example music, video or image playback modes.

The device 100 of FIG. 1 can generally comprise any suitable electronic device, such as for example a personal computer, a personal digital assistant (PDA), a media player, a mobile terminal, a mobile communication terminal in the form of a cellular/mobile phone, or a multimedia device or computer. In alternate embodiments, the device 100 of FIG. 1 may be a personal communicator, a mobile phone, a tablet computer, a laptop or desktop computer, a television or television set top box or any other suitable device capable of containing for example a display 52 shown in FIG. 5, and supported electronics such as the processor 618 and memory 602 of FIG. 6. For description purposes, the embodiments described herein with reference to a mobile communications device are for exemplary purposes only and it should be understood that the embodiments could be applied equally to any suitable device incorporating a display, processor, memory and supporting software or hardware.

Referring to FIG. 5, in one embodiment, the mobile device 50 generally comprises a user interface having a housing 51, a display 52, an on/off button (not shown), an audio output device 55 (only the opening is shown), and an audio input device (not shown). The mobile device 50 of FIG. 5 is generally adapted for communication via a cellular network, such as the GSM 900/1800 MHz network. In alternate embodiments, the mobile device is adapted for use on any suitable communication network, such as for example a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

Referring again to FIG. 5, in one embodiment the device 50 has a user interface that can include a user input device such as a keypad with first group of keys 57. The keys 57 can be alphanumeric keys and can be used for example to enter a telephone number, write a text message (SMS), or write a name (associated with the phone number). Each of the twelve alphanumeric keys 57 shown in FIG. 1 can be associated with a alphanumeric such as "A-Z" or "0-9", or a symbol, such as "#" or "*", respectively. In alternate embodiments, any suitable number of keys can be used, such as for example a QWERTY keyboard, modified for use in a mobile device. In an alpha mode, each key 57 can be associated with a number of letters and special signs used in the text editing.

The user interface of the mobile device 50 can also include a second group of keys 58 that can include for example, soft keys 59a, 59b, call handling keys 56a, 56b, and a multi-function/scroll key 54. The call handling keys 56a and 56b can comprise a call key (on hook) and an end call (off hook). The keys 58 can also include a 5-way navigation key 54 (up, down, left, right and center: select/activate). The function of the soft keys 59a and 59b generally depends on the state of the device, and navigation in the menus of applications of the device can be performed using the navigation key 54. In one embodiment, the current function of each of the soft keys 59a and 59b can be shown in separate fields or soft labels in respective dedicated areas 53a and 53b of the display 52. These areas 53a and 53b can generally be positioned in areas just above the soft keys 59a and 59b. The two call handling keys 56a and 56b are used for establishing a call or a conference call, terminating a call or rejecting an incoming call. In alternate embodiments, any suitable or key arrangement and function type can make up the user interface of the device 50, and a variety of different arrangements and functionalities of keys of the user interface can be utilized.

In one embodiment, the navigation key 54 can comprise a four- or five-way key which can be used for cursor movement, scrolling and selecting (five-way key) and is generally placed centrally on the front surface of the phone between the display 52 and the group of alphanumeric keys 57. In alternate embodiments, the navigation key 54 can be placed in any suitable location on user interface of the device 100.

The display 51 of the device 50 can comprise any suitable display, such as for example, a touch screen display or graphical user interface. In one embodiment, the display 51 can be integral to the device 50. In alternate embodiments the display may be a peripheral display connected or coupled to the device 50. A pointing device, such as for example, a stylus, pen or simply the user's finger may be used with the display 52. In alternate embodiments any suitable pointing device may be used. In other alternate embodiments, the display may be any suitable display, such as for example a flat display 52 that is typically made of an LCD with optional back lighting, such as a TFT matrix capable of displaying color images. A touch screen may be used instead of a conventional LCD display.

The device 50 may also include other suitable features such as, for example, a camera, loudspeaker, connectivity port or tactile feedback features, including those described with respect to the multifunction navigational keys 54a-54e.

Figure 6:
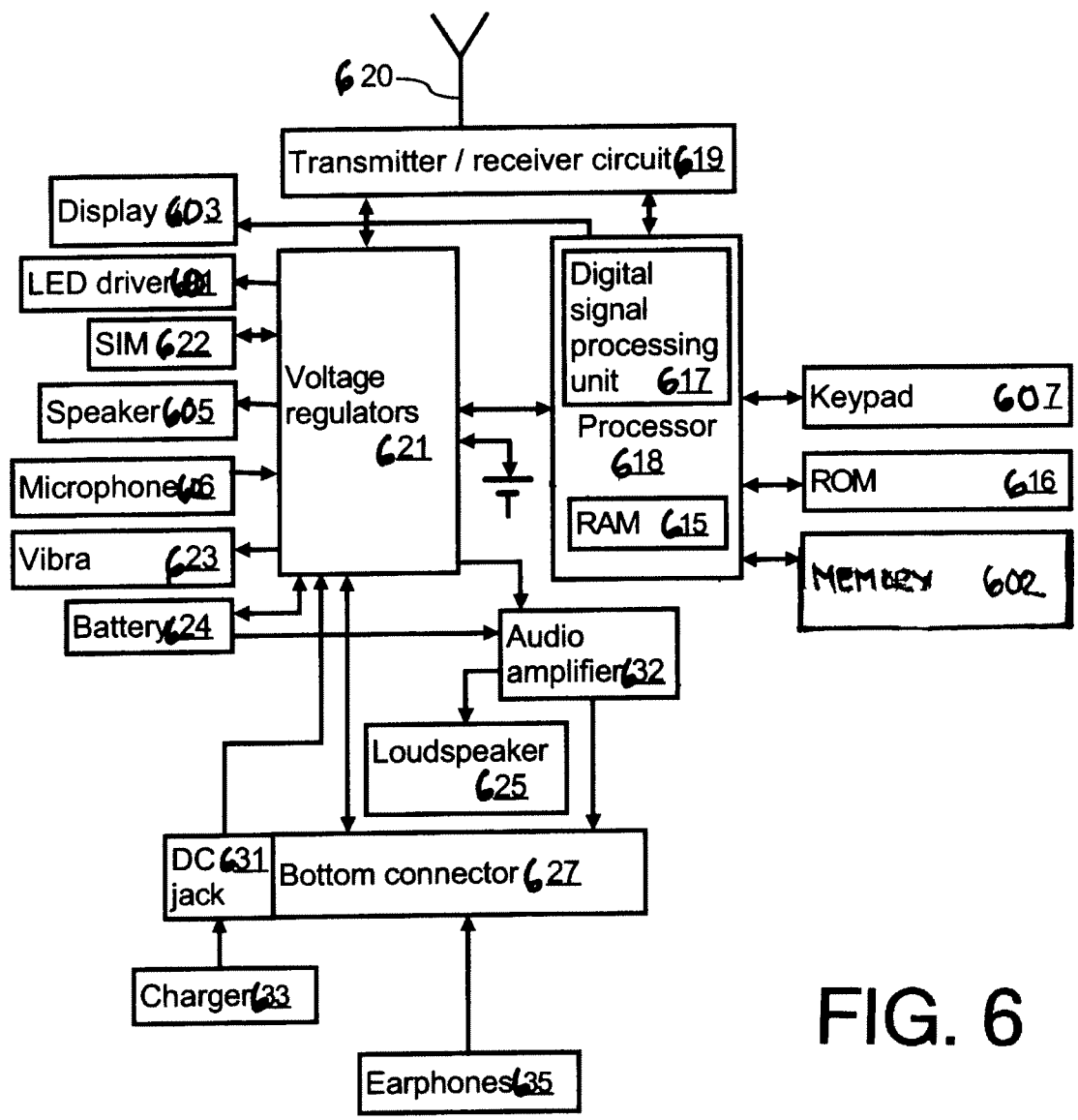
FIG. 6 is a block diagram illustrating the general architecture of the exemplary mobile device of FIG. 1.

FIG. 6 illustrates in block diagram form one embodiment of a general architecture of the mobile device 50 of FIG. 5. The mobile communications device 100 may have a processor 618 connected to the display 603 for processing user inputs and displaying information on the display 603. The processor 618 controls the operation of the device and can have an integrated digital signal processor 617 and an integrated RAM 615. The processor 618 controls the communication with a cellular network via a transmitter/receiver circuit 619 and an internal antenna 620. A microphone 606 is coupled to the processor 618 via voltage regulators 621 transforms the user's speech into analog signals. The analog signals formed are A/D converted in an A/D converter (not shown) before the speech is encoded in the DSP 617 that is included in the processor 618. The encoded speech signal is transferred to the processor 618, which e.g. supports the GSM terminal software. The digital signal-processing unit 617 speech-decodes the signal, which is transferred from the processor 618 to the speaker 5 via a D/A converter (not shown).

A processor 618 can also include memory 602 for storing any suitable information and/or applications associated with the mobile communications device 50 such as phone book entries, calendar entries, etc.

The processor 618 also forms the interface for peripheral units of the device, such as for example, a (Flash) ROM memory 616, the graphical display 603, the keypad 607, a ringing tone selection unit 626, and an incoming call detection unit 628. In alternate embodiments, any suitable peripheral units for the device 50 can be included.

The software in the RAM 615 and/or in the flash ROM 616 contains instructions for the processor 618 to perform a plurality of different applications and functions.

Figure 7:
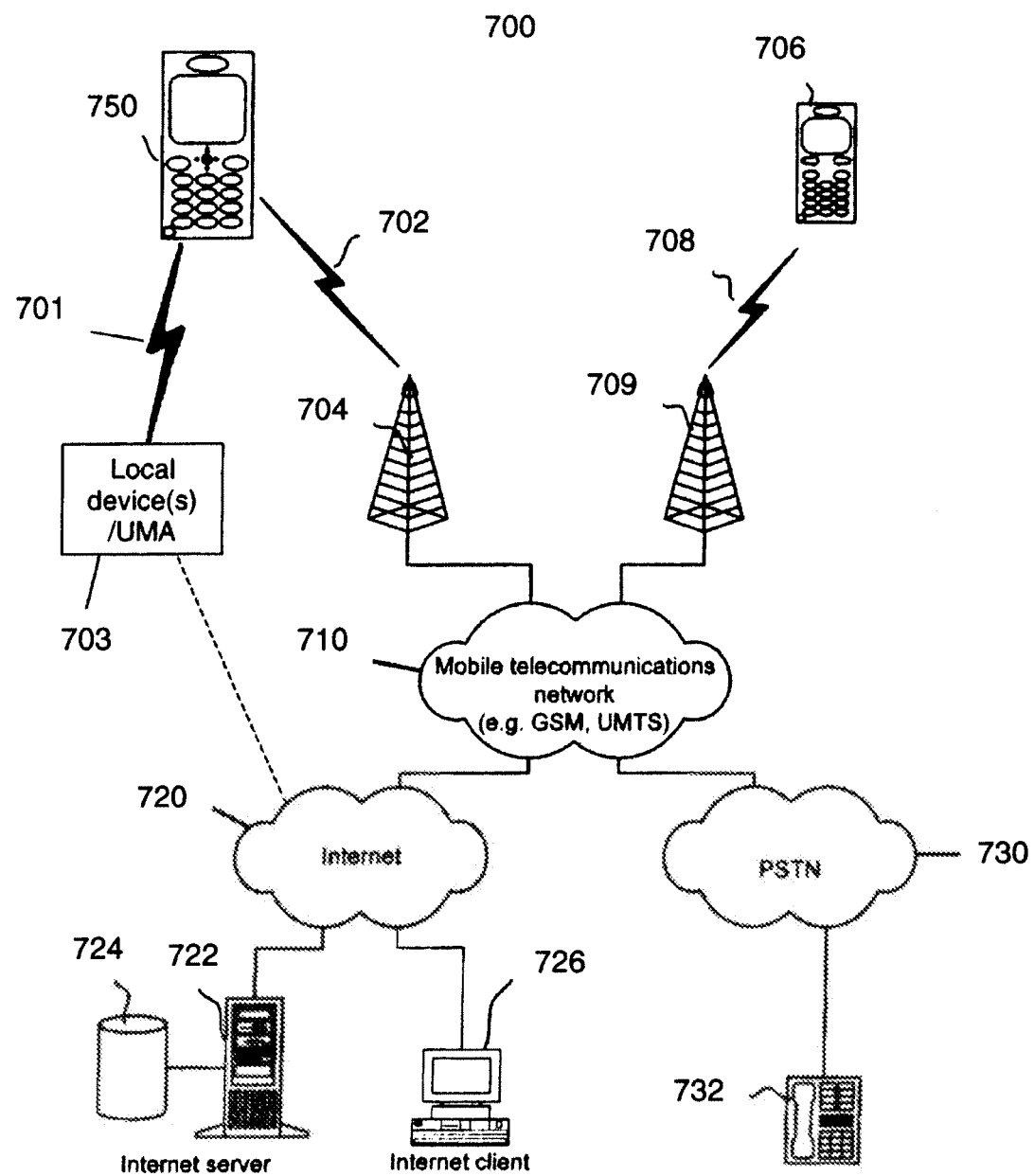
FIG. 7 illustrates one example of a schematic diagram of a network in which aspects of the disclosed embodiments may be practiced.

Referring to FIG. 7, one embodiment of a communication system in which the disclosed embodiments can be used is illustrated. In the communication system 700 of FIG. 7, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 750 and other devices, such as another mobile terminal 706, a stationary telephone 732, or an internet server 722. It is to be noted that for different embodiments of the mobile terminal 750 and in different situations, different ones of the telecommunications services referred to above may or may not be available. The aspects of the invention are not limited to any particular set of services in this respect.

The mobile terminals 750, 706 may be connected to a mobile telecommunications network 710 through radio frequency (RF) links 702, 708 via base stations 704, 709. The mobile telecommunications network 710 may be in compliance with any commercially available mobile telecommunications standard such as, for example, GSM, UMTS, D-AMPS, CDMA2000, FOMA and TD-SCDMA or other such suitable communication standard or protocol The mobile telecommunications network 710 may be operatively connected to a wide area network 720, which may be the Internet or a part thereof. An Internet server 722 has data storage 724 and can be connected to the wide area network 720, as is for example, an Internet client computer 726. The server 722 may host a www/wap server capable of serving www/wap content to the mobile terminal 700. In alternate embodiments, the server 722 can host any suitable transaction oriented protocol.

For example, a public switched telephone network (PSTN) 730 may be connected to the mobile telecommunications network 710 in a familiar manner. Various telephone terminals, including the stationary telephone 732, may be connected to the PSTN 730.

The mobile terminal 750 is also capable of communicating locally via a local link 701 to one or more local devices 703. The local link 701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values to the mobile terminal 700 over the local link 701. The above examples are not intended to be limiting, and any suitable type of link may be utilized. The local devices 703 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the Internet. The mobile terminal 750 may thus have multi-radio capability for connecting wirelessly using mobile communications network 710, WLAN or both. Communication with the mobile telecommunications network 710 may also be implemented using WiFi, WiMax, or any other suitable protocols, and such communication may utilize unlicensed portions of the radio spectrum (e.g. unlicensed mobile access (UMA)).

Figure 8:
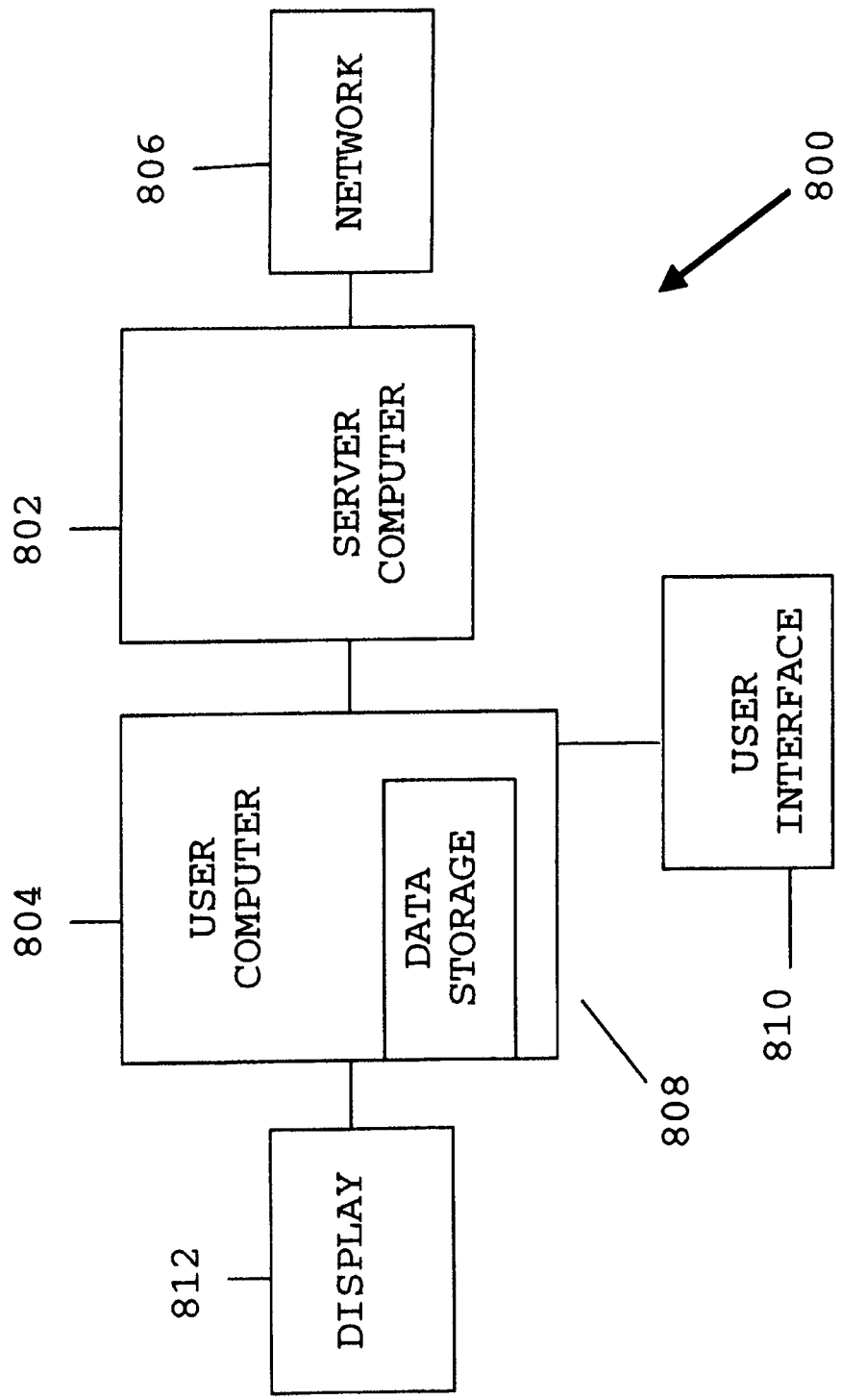
FIG. 8 illustrates a block diagram of an example of an apparatus incorporating features that may be used to practice aspects of the disclosed embodiments.

The disclosed embodiments may also include software and computer programs incorporating the process steps and instructions described above that are executed in different computers. FIG. 8 is a block diagram of one embodiment of a typical apparatus 800 incorporating features that may be used to practice aspects of the invention. The apparatus 800 can include computer readable program code means for carrying out and executing the process steps described herein. As shown, a computer system 802 may be linked to another computer system 804, such that the computers 802 and 804 are capable of sending information to each other and receiving information from each other. In one embodiment, computer system 802 could include a server computer adapted to communicate with a network 806. Computer systems 802 and 804 can be linked together in any conventional manner including, for example, a modem, hard wire connection, or fiber optic link. Generally, information can be made available to both computer systems 802 and 804 using a communication protocol typically sent over a communication channel or through a dial-up connection on ISDN line. Computers 802 and 804 are generally adapted to utilize program storage devices embodying machine-readable program source code, which is adapted to cause the computers 802 and 804 to perform the method steps, disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ('ROM') floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the invention may be stored in one or more computers 802 and 804 on an otherwise conventional program storage device. In one embodiment, computers 802 and 804 may include a user interface 810, and a display interface 812 from which aspects of the invention can be accessed. The user interface 810 and the display interface 812 can be adapted to allow the input of queries and commands to the system, as well as present the results of the commands and queries.

The disclosed embodiments provide an easy and efficient method to provide and access controls and functions related to content handling, such as media playback, messaging, data processing and web browsing. A user interface is presented that allows access to control and functions related to the application, without the need to browse through different menus and sub-menus to enable and/or access the various functionalities. The functions that are presented can be pre-defined, the most commonly used or a user configured arrangement. The user interface can also be context sensitive, adapt to the particular application or mode, and present suitable functions and controls. Display and screen real estate is preserved and efficiently utilized to enable use of the state menu system not only on large display devices, but also on smaller display devices. Navigation in an application is more efficient due to the relative immediate presentation and accessibility of desired function controls and modes, and the mapping of the various controls to the particular input device. The mapping can be customized to the particular device to enable use of various input devices such as hard keys, soft keys, and multifunctional devices, and allow an intuitive correlation between the menu displayed on the screen and the controls of the device.

It should be understood that the foregoing description is only illustrative of the embodiments of the claimed invention. Various alternatives and modifications can be devised by those skilled in the art without departing from the embodiments. Accordingly, the disclosed embodiments are intended to embrace all such alternatives, modifications and variances that fall within the scope of the appended claims.

What is claimed is:

1. A method for selecting at least two functions of an application for use with a state menu control system, the method comprising:
determining a plurality of functions available from at least one menu of the application, wherein the determining occurs prior to providing a state menu for the application;
categorizing a first function of the plurality of functions based on a pre-determined criterion, wherein the pre-determined criterion is a frequency of use of a function with respect to a mode of the application;

making the first function available in a state menu according to the pre-determined criterion and making a second function available in the state menu according to a user setting, wherein making the first function and the second function available includes;
  mapping the first function and the second function to a single user-selectable input key of an input device associated with the state menu control system, wherein the mapping is changeable to a different user-selectable input key of the input device;
  associating the first function with a first period of time and associating the second function with a second period of time different than the first period of time, wherein pressing the input key for the first period of time selects the first function and pressing the input key for the second period of time selects the second function;
  highlighting a first region on the state menu corresponding to the first function during the first period of time and not during the second period of time, and highlighting a second region on the state menu corresponding to the second function during the second period of time and not during the first period of time;
displaying the state menu to a user of the application; and
hiding the state menu when no user input is received for a defined length of time, wherein the first function and second function are not mapped to the input key while the state menu is hidden.

2. The method of claim 1 wherein making at least one of the functions available in the state menu occurs prior to the application being opened.

3. The method of claim 2 further comprising opening the application when the function is activated via the state menu.

4. The method of claim 1 wherein the user-selectable key and the different user-selectable key are located on a single menu level of the state menu.

\* \* \* \* \*